(12) United States Patent
Wang et al.

(10) Patent No.: US 10,883,730 B2
(45) Date of Patent: Jan. 5, 2021

(54) SMART WATER SUPPLYING METHOD AND SMART WATER SUPPLY

(71) Applicants: Li-Chuan Wang, Taipei (TW); Sheng-Chieh Tang, Taipei (TW); Tso-I Kuei, Taipei (TW); Jung-Ming Hung, Taipei (TW)

(72) Inventors: Li-Chuan Wang, Taipei (TW); Sheng-Chieh Tang, Taipei (TW); Tso-I Kuei, Taipei (TW); Jung-Ming Hung, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 137 days.

(21) Appl. No.: 16/199,215

(22) Filed: Nov. 25, 2018

(65) Prior Publication Data

US 2019/0162426 A1    May 30, 2019

Related U.S. Application Data

(60) Provisional application No. 62/610,939, filed on Dec. 28, 2017, provisional application No. 62/590,668, filed on Nov. 27, 2017.

(51) Int. Cl.
*F24D 19/10* (2006.01)
*E03B 7/00* (2006.01)
(Continued)

(52) U.S. Cl.
CPC .......... *F24D 19/1051* (2013.01); *E03B 7/00* (2013.01); *G06F 3/011* (2013.01); *G06F 3/017* (2013.01); *G06K 9/00355* (2013.01)

(58) Field of Classification Search
CPC . E03B 7/00; E03C 1/055; E03C 1/057; F24D 19/1051; G06F 3/011; G06F 3/017; G06K 9/00355
See application file for complete search history.

(56) References Cited

U.S. PATENT DOCUMENTS 5,226,629 A * 7/1993 Millman ................. E03C 1/055
  137/606
5,853,130 A * 12/1998 Ellsworth ............. B05B 12/122
  239/548

(Continued)

FOREIGN PATENT DOCUMENTS

| CN | 105725891 | 7/2016 |
| CN | 107131657 | 9/2017 |

(Continued)

OTHER PUBLICATIONS

"Office Action of China Counterpart Application", dated May 15, 2020, p. 1-11.

*Primary Examiner* — Kidest Bahta
(74) *Attorney, Agent, or Firm* — JCIPRNET

(57) ABSTRACT

The disclosure provides a smart water supplying method and a smart water supply. The method includes: detecting an external object to obtain a plurality of detection data; estimating at least one characteristic data of the external object according to the detection data; determining at least one water supplying signal according to the characteristic data of the external object; and providing a real stream according to the water supplying signal.

58 Claims, 22 Drawing Sheets

(51) Int. Cl.
    *G06K 9/00*      (2006.01)
    *G06F 3/01*      (2006.01)

(56)  References Cited

U.S. PATENT DOCUMENTS

| | | | | |
|---|---|---|---|---|
| 9,886,838 | B2 | 2/2018 | Felch | |
| 2002/0007510 | A1* | 1/2002 | Mann | E03C 1/057 4/300 |
| 2006/0231782 | A1* | 10/2006 | Iott | E03C 1/057 251/129.04 |
| 2007/0246550 | A1* | 10/2007 | Rodenbeck | G05D 23/1353 236/12.11 |
| 2011/0320134 | A1* | 12/2011 | Butler | C02F 1/008 702/25 |
| 2012/0029704 | A1* | 2/2012 | Ackermann | E06B 9/322 700/275 |
| 2013/0340162 | A1* | 12/2013 | Peel | B05D 1/24 4/676 |
| 2016/0076231 | A1* | 3/2016 | Goel | E03C 1/055 700/283 |
| 2017/0260722 | A1* | 9/2017 | Horwitz | G01F 15/06 |

FOREIGN PATENT DOCUMENTS

| | | |
|---|---|---|
| JP | 2016041874 | 3/2016 |
| TW | I547626 | 9/2016 |

* cited by examiner

SMART WATER SUPPLYING METHOD AND SMART WATER SUPPLY

CROSS-REFERENCE TO RELATED APPLICATION

This application claims the priority benefit of U.S. provisional application Ser. No. 62/610,939, filed on Dec. 28, 2017 and U.S. provisional application Ser. No. 62/590,668, filed on Nov. 27, 2017. The entirety of each of the above-mentioned patent applications is hereby incorporated by reference herein and made a part of specification.

BACKGROUND OF THE DISCLOSURE

Field of the Disclosure

The present disclosure relates to a smart water supplying method and a smart water supply, and more particularly to a method for providing a real stream based on the characteristic data of a detected external object and a smart water supply.

Description of Related Art

With the development of science and technology, modern people are increasingly demanding in terms of the quality of life at home. Therefore, all manufacturers are committed to the development of a variety of smart furniture that can improve convenience and quality of people's life, and there are many furniture that allows users to control with gestures, such as smart water heaters.

However, when the user operates a conventional smart water heater, typically it is necessary to perform a specific gesture (for example, opening the palm) to control the smart water heater to discharge stream, and then adjust the water amount by a subsequent input gesture. In other words, the conventional smart water heater cannot directly customize the amount of discharged stream according to the user's needs. In this case, when the user needs a more or less amount of water, it is necessary to additionally input a specific gesture to adjust the amount of water, which is inconvenient and unintuitive in operation.

SUMMARY OF THE DISCLOSURE

In view of the foregoing, the present disclosure provides a smart water supplying method and a smart water supply capable of solving the above technical problems.

The disclosure provides a smart water supplying method, including: detecting an external object to obtain a plurality of detection data; estimating at least one characteristic data of the external object according to the detection data; determining at least one water supply signal according to the characteristic data of the external object; and providing a real stream based on the water supply signal.

The disclosure provides a smart water supply, which includes an object detecting module, a water supplying module and a control component. The object detecting module is configured to detect an external object. The control component is electrically connected to the object detecting module and the water supplying module, and is configured to perform the following steps: when the object detecting module detects the external object, estimating a characteristic data of the external object; determining, according to the characteristic data, a water supplying signal; and controlling the water supplying module to provide a real stream according to the water supplying signal.

According to the above, the smart water supplying method and the smart water supply provided by the present disclosure may discharge the real stream correspondingly after estimating the characteristic data of the external object appearing in the detection range, so that the user can operate the smart water supply through a more intuitive, convenient and novel method.

In order to make the aforementioned features and advantages of the disclosure more comprehensible, embodiments accompanying figures are described in detail below.

DESCRIPTION OF EMBODIMENTS

Figure 1A:
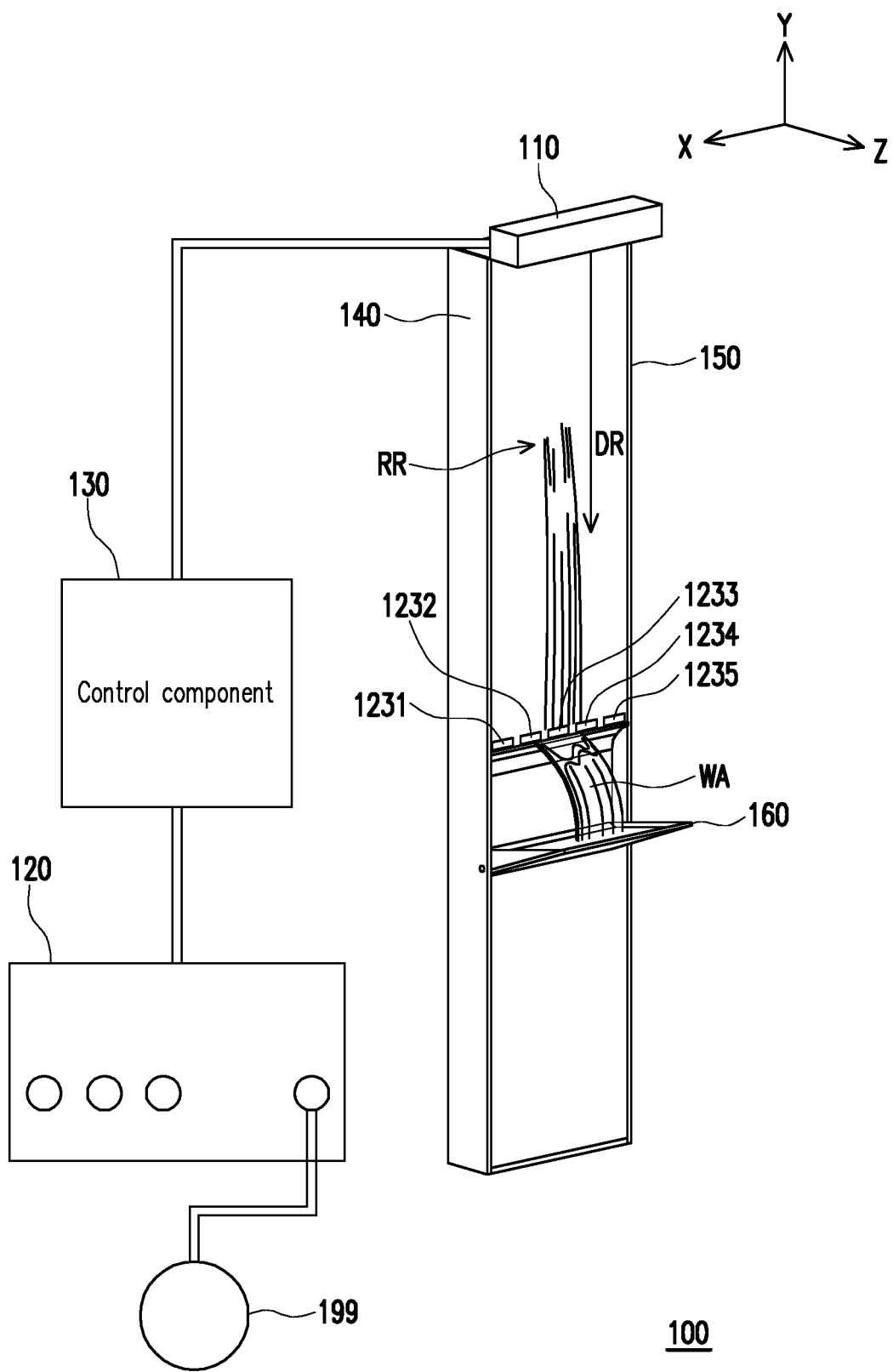
FIG. 1A is a schematic view of a smart water supply according to a first embodiment of the present disclosure.
Figure 1B:
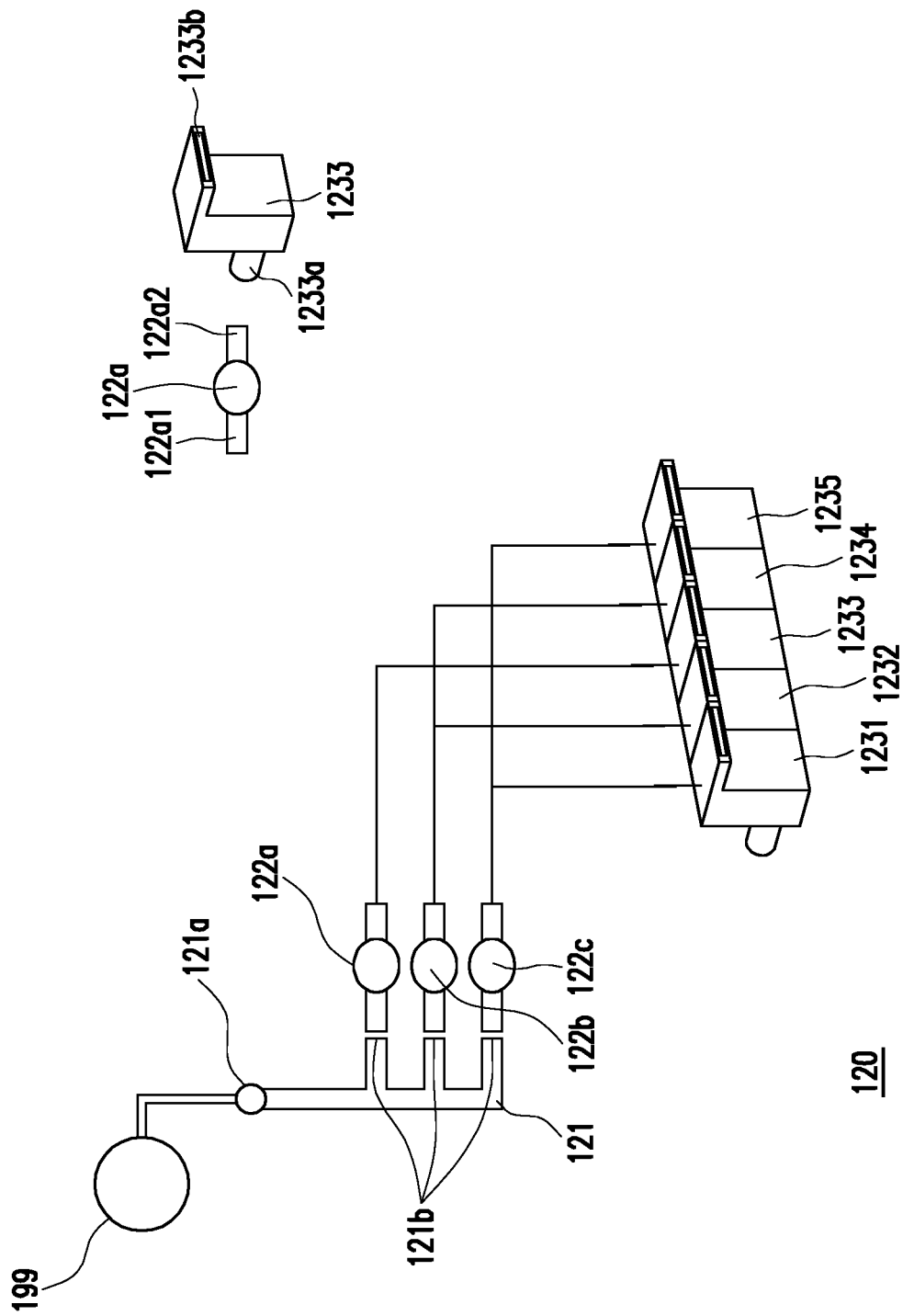
FIG. 1B is a schematic view illustrating a water supplying module according to FIG. 1A.

Referring to FIG. 1A and FIG. 1B, FIG. 1A is a schematic view of a smart water supply according to a first embodiment of the present disclosure, and FIG. 1B is a schematic view illustrating a water supplying module according to FIG. 1A. As shown in FIG. 1A, a smart water supply 100 is, for example, an electronic wash basin that supplies a real stream WA (such as a real waterfall) that can be used for washing in response to user's control. The smart water supply 100 may include an object detecting module 110, a water supplying module 120, and a control component 130. In this embodiment, the object detecting module 110 may be used to detect an external object (such as a human hand) that appears in a detection range RR. For ease of explanation, it is assumed that the object detecting module 110 performs detection toward a preset direction DR in FIG. 1A, or may be regarded as detecting in the direction of the −Y axis. In other words, the above-described detection range RR may be roughly regarded as an area located in front of the mirror of a unidirectional glass 150, but the present disclosure is not limited thereto.

For ease of explanation, it is assumed that the object detecting module 110 is an infrared object detecting module capable of capturing an infrared image of an external object, and a depth camera for capturing a depth image. In other embodiments, the object detecting module 110 may also be implemented as an ultrasonic object detecting module and/or a radar object detecting module, but the present disclosure is not limited thereto. In addition, the smart water supply 100 may further include a display module 140, a unidirectional glass 150, and a water tank 160, wherein the unidirectional glass 150 may be attached to the surface of the display module 140, and the water tank 160 may be used to receive the real stream WA. In other embodiments, the unidirectional glass 150 may also be replaced with a general mirror, but the disclosure is not limited thereto.

As shown in FIG. 1B, the water supplying module 120 may include a first water inlet 199, a multi-channel pipe 121, electromagnetic valves 122a, 122b, 122c, and water outlet components 1231, 1232, 1233, 1234, and 1235. The first water inlet 199 may be used to supply a first stream. In various embodiments, the first water inlet 199 may be a cold-water inlet that may be used to supply cold water cooler than body temperature. Alternatively, the first water inlet 199 may also be a hot water inlet that may be used to supply hot water hotter than body temperature. In addition, the first water inlet 199 may also be implemented as a non-potable water inlet or a drinking water inlet.

The multi-channel pipe 121 includes a water inlet 121a and a plurality of water outlets 121b, wherein the water inlet 121a of the multi-channel pipe 121 is connected to the first water inlet 199. The electromagnetic valves 122a-122c are electrically connected to the control component 130, and the electromagnetic valves 122a-122c may be controlled to be fully or partially opened by the control component 130. Each of the electromagnetic valves 122a-122c includes a water inlet and a water outlet, and the water inlet of each of the electromagnetic valves 122a-122c is connected to one of the water outlets 121b of the multi-channel pipe 121. Taking the electromagnetic valve 122a as an example, it has a water inlet 122a1 and a water outlet 122a2, and the water inlet 122a1 of the electromagnetic valve 122a is connected to the water outlet 121b of the multi-channel pipe 121. Each of the water outlet components 1231 to 1235 includes a water inlet and a water outlet, and the water inlet of each of the water outlet components 1231 to 1235 are connected to the water outlet of one of the electromagnetic valves 122a to 122c. Taking the water outlet component 1233 as an example, it includes a water inlet 1233a and a water outlet 1233b, and the water inlet 1233a of the water outlet component 1233 is connected to the water outlet 122a2 of the electromagnetic valve 122a.

In the embodiment of FIG. 1B, the electromagnetic valve 122a may be controlled by the control component 130 for controlling the opening or closing of the path between the first water inlet 199 and the water outlet component 1233. Specifically, when the electromagnetic valve 122a is controlled to be opened, the first stream from the first water inlet 199 can be fed to the water inlet 1233a of the water outlet component 1233 and flow out through the water outlet 1233b of the water outlet component 1233. On the contrary, when the electromagnetic valve 122a is controlled to be closed, the stream from the first water inlet 199 cannot be fed to the water inlet 1233a of the water outlet component 1233, so that the water outlet 1233b of the water outlet component 1233 stops discharging water.

Similarly, the electromagnetic valve 122b may be used to simultaneously control the opening or closing of the path between the first water inlet 199 and the water outlet components 1232 and 1234, and the electromagnetic valve 122c may be used to simultaneously control the opening or closing of the path between the first water inlet 199 and the water outlet components 1231 and 1235. However, FIG. 1B is for illustration only and is not intended to limit the possible embodiments of the disclosure.

In the embodiment of FIG. 1B, it is assumed that each of the water outlet components 1231 to 1235 can provide a unit stream (which comes from the first water inlet 199) according to the unit of water discharging amount when the corresponding electromagnetic valve is opened, and the unit stream supplied by each of the water outlet components 1231 to 1235 may be regarded as a real stream WA as a whole (which includes the first water stream described above). Specifically, when only the electromagnetic valve 122a is opened, since only the water outlet component 1233 can provide one unit stream, the water supply amount corresponding to the real stream WA is one unit of water supply amount. When the electromagnetic valves 122a and 122b are both opened, each of the water outlet components 1232 to 1234 can provide one unit stream, so the water supply amount corresponding to the real stream WA is three units of water supply amount. When the electromagnetic valves 122a-122c are all opened, each of the water outlet components 1231-1235 can provide one unit stream, so the water supplying signal corresponding to the real stream WA is five units of water supplying signals. However, the above description is for illustrative purposes only and is not intended to limit the possible embodiments of the disclosure.

In various embodiments, the control component 130 electrically connected to the object detecting module 110 and the water supplying module 120 may be implemented as a general-purpose processor, a specific-purpose processor, a conventional processor, a digital signal processor, a plurality of microprocessors, one or more microprocessors combined with a digital signal processor core, a controller, a microcontroller, an application specific integrated circuit (ASIC), a field programmable gate array (FPGA) circuit, any other kinds of integrated circuit, state machine, advanced RISC machine (ARM)-based processor and the like.

In an embodiment of the disclosure, the control component 130 may load a specific code or a software module to perform the smart water supplying method proposed by the present disclosure, as further described below.

Figure 2:
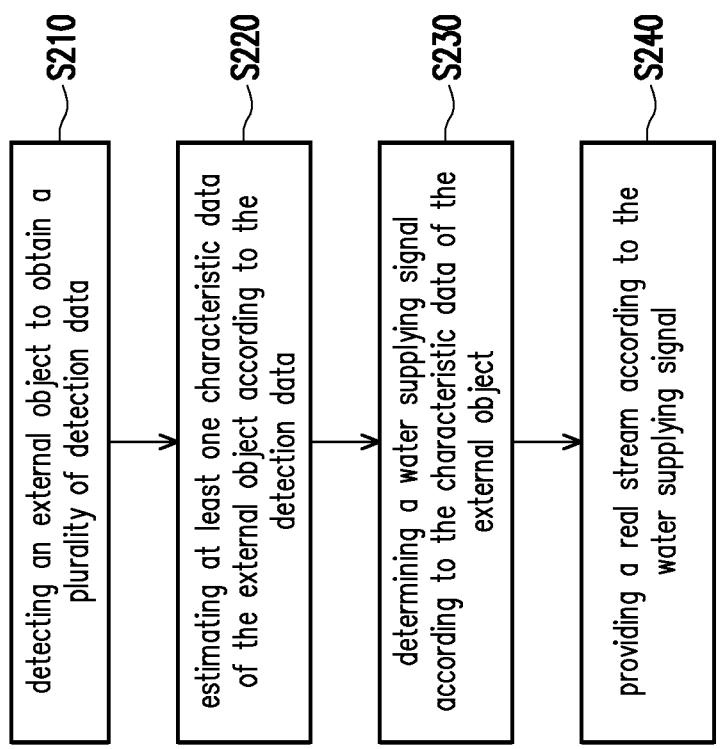
FIG. 2 is a flow chart of a smart water supplying method according to the first embodiment of the present disclosure.

Please refer to FIG. 2, which is a flow chart of a smart water supplying method according to the first embodiment of the present disclosure. The method of the present embodiment may be performed by the smart water supply 100 of FIG. 1, and the details of the steps of the method are described below with reference to the components of FIG. 1.

First, in step S210, the object detecting module 110 detects an external object to obtain a plurality of detection data. Moreover, in step S220, the control component 130 may estimate at least one characteristic data of the external object according to the detection data. To facilitate describing the concepts of steps S210 and S220, the following descriptions are made with reference to FIG. 3.

Figure 3:
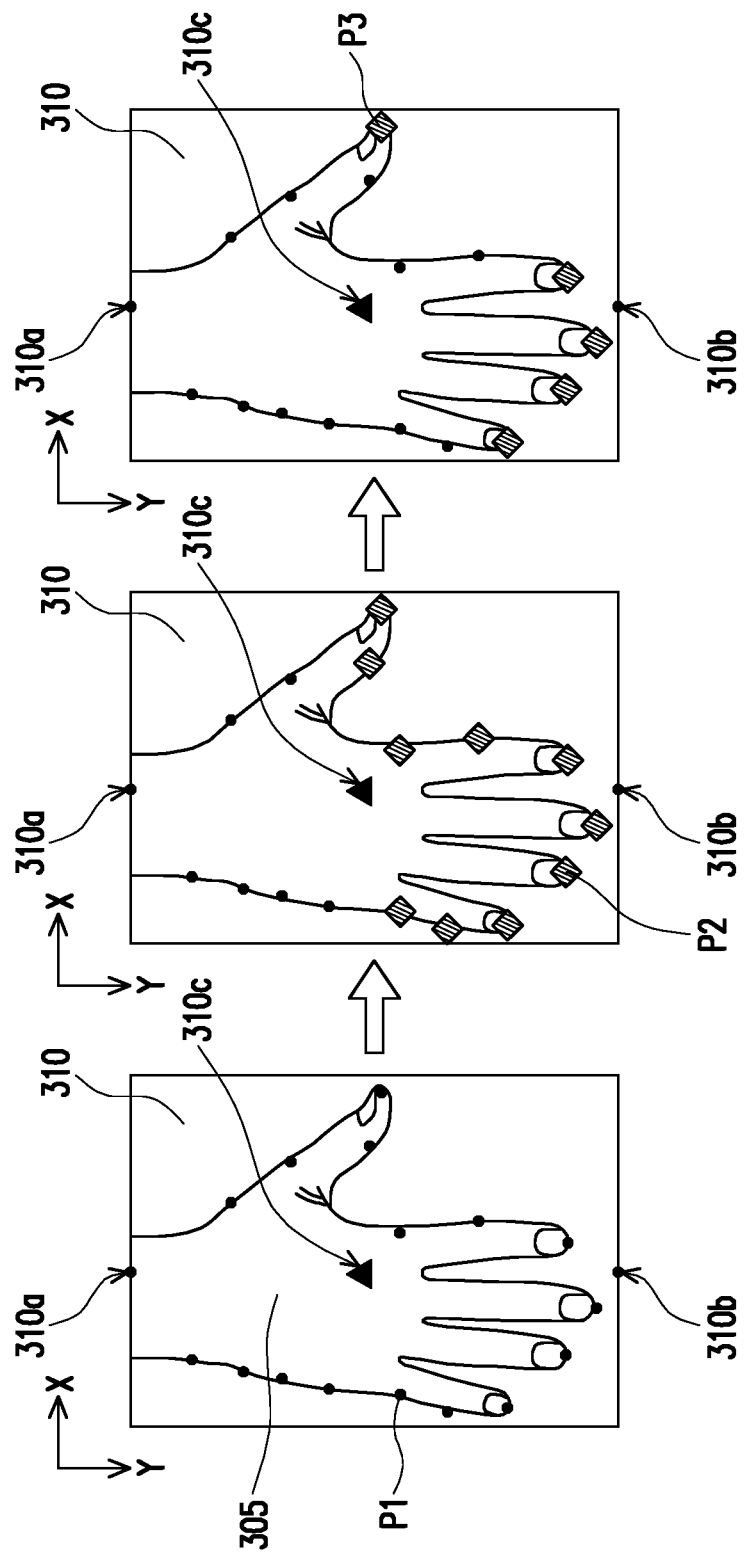
FIG. 3 is a schematic view illustrating estimating characteristic data of an external object according to a detection data according to the first embodiment of the present disclosure.

Please refer to FIG. 3, which is a schematic view illustrating estimating characteristic data of an external object according to a detection data according to the first embodiment of the present disclosure. An external object 305 in the embodiment of FIG. 3 is assumed to be a hand that presents a specific gesture (e.g., open palm). In this case, the control component 130 can control the object detecting module 110 (i.e., depth camera) to capture at least one image (e.g., an infrared image and a depth image) of the external object 305, and analyze the image to obtain the number of at least one specific profile coordinate, where the characteristic data contains the number of specific profile coordinates.

In one embodiment, the control component 130 may be configured to: use the depth image as a mask, and combine the depth image with the infrared image to generate a combined image; binarize a plurality of depth signals in the combined image to generate a binarized image; obtain A profile coordinates P1 (which are exemplified as solid dots in FIG. 3A) in the binarized image through the convex hull algorithm; retrieve four profile coordinates having maximum and minimum X, Y coordinate values from the A profile coordinates; generate a rectangular object according to the four profile coordinates; and calculate a central coordinate of the rectangular object according to the four profile coordinates.

In one embodiment, the rectangular object is, for example, a binary large object (BLOB) 310. As shown in FIG. 3, the BLOB 310 has, for example, a top edge 310a, a bottom edge 310b, and a central coordinate 310c, wherein the central coordinate 310c is, for example, a central point of the BLOB 310.

After generating the BLOB 310, the control component 130 may retrieve M profile coordinates P2 (which is exemplified as a diamond with a diagonal line in FIG. 3) having a Y coordinate value greater than a Y coordinate value of the central coordinate 310c from the profile coordinates P1. Next, the control component 130 may deduct the Y coordinate value of the M profile coordinates P2 from the maximum Y coordinate value to obtain M Y coordinate difference, and retrieve N profile coordinate having the Y coordinate difference smaller than a first threshold from the M profile coordinates P2. In this embodiment, it is assumed that the Y coordinate difference of each of the profile coordinates P2 is smaller than the first threshold, so the N profile coordinates are the profile coordinates P2.

Thereafter, the control component 130 may calculate N−1 X coordinate differences between adjacent N profile coordinates; determine whether N−1 X coordinate differences are greater than a second threshold; and retrieve B profile coordinates from the N profile coordinates, wherein the B profile coordinates are specific profile coordinates P3. In one embodiment, if the X coordinate difference is smaller than the second threshold, the adjacent profile coordinates are merged, and the profile coordinates with larger Y coordinate value are retrieved. In another embodiment, if the X coordinate difference is larger than the second threshold, the adjacent profile coordinate is retrieved. That is, the control component 130 may regard two of the N profile coordinates that are too close to each other as the same profile coordinate.

Next, the control component 130 may define the B profile coordinates as a specific profile coordinate P3, thereby obtaining the number of specific profile coordinates P3 (i.e., characteristic data).

Referring again to FIG. 2, in step S230, the control component 130 may determine the water supplying signal according to the characteristic data of the external object 305. In one embodiment, the control component 130 may obtain the number of opened electromagnetic valves 122a-122c according to the number of specific profile coordinates, wherein the water supplying signal includes the quantity of opened electromagnetic valves 122a-122c.

Next, in step S240, the control component 130 may provide a real stream WA according to the water supplying signal. According to the relevant assumptions of the embodiment of FIG. 1B, since the water outlet components 1231 to 1235 may make the water supply amount corresponding to the real stream WA to be one, three or five units of water supply amount in response to the opening of the electromagnetic valves 122a-122c, it is assumed in the following description that a larger number of specific profile coordinates may be used to control the water supplying module 120 to provide more units of water supply amount as the real stream WA. In the present embodiment, the number of specific profile coordinates may be interpreted as corresponding to the number of fingers postured by the user in the gesture, but the disclosure is not limited thereto.

Specifically, assuming that the number of detected specific profile coordinates is one, then the control component 130 can only open the electromagnetic valve 122a to allow only the water outlet component 1233 to supply a unit stream corresponding to one unit of water supply amount as the real stream WA. Assuming that the number of detected specific profile coordinates is two, then the control component 130 can simultaneously open the electromagnetic valves 122a and 122b so that each of the water outlet components 1232-1234 supplies a unit stream corresponding to one unit of water supply amount, and the unit stream supplied by each of the water outlet components 1232-1234 may collaboratively form a real stream WA having three units of water supply amount. Assuming that the number of detected specific profile coordinates is five, then the control component 130 can simultaneously open the electromagnetic valves 122a-122c so that each of the water outlet components 1231-1235 supplies a unit stream corresponding to one unit of water supply amount, and the unit stream supplied by each of the water outlet components 1231-1235 may collaboratively form a real stream WA having five units of water supply amount. It should be understood that the above description serves as example only and is not intended to limit the possible embodiments of the disclosure.

It can be seen from the above that the smart water supplying method and the smart water supply proposed by the present disclosure determine the water supplying signal according to the characteristic data of the external object detected within the detection range, and the real stream is discharged accordingly. Therefore, the user can intuitively adjust the water supplying signal of the stream by adjusting the number (for example, the number of fingers in the gesture) of specific profile coordinates within the detection range, so that the smart water supply can directly discharge the real steam corresponding to user's needs. In this manner, the user can operate the smart water supply in a more intuitive and novel manner, thereby improving the convenience of operation and the user experience.

In addition, in one embodiment, before controlling the water supplying module 120 to supply the real stream WA corresponding to the water supplying signal, the control component 130 may first determine whether the external object 305 moves a predetermined distance toward the preset direction DR within a specific time. If so, the control component 130 may control the water supplying module 120 to begin supplying the real stream WA corresponding to the water supplying signal. Otherwise, the control component 130 may control the water supplying module 120 not to supply the real stream WA.

Specifically, the control component 130 may first analyze the image captured by the object detecting module 110 to obtain a vector value. Thereafter, the control component 130 may obtain a plurality of rectangular objects and a plurality of central coordinates through a shortest distance tracking method, and calculate adjacent central coordinate difference to obtain a plurality of instantaneous motion vectors. Then, the control component 130 may perform a direction classification and quantity accumulation on the plurality of instantaneous motion vectors according to the X and Y coordinate values of the plurality of instantaneous motion vectors. Moreover, the control component 130 may classify the direction of which the accumulated number is the largest, and define it as the direction of the vector value. In various embodiments, the directions may be classified in the sense of from-top-to-bottom, staying still, and being horizontal.

In short, before actually controlling the water supplying module 120 to discharge the real stream WA, the control component 130 may determine whether the direction of the vector value corresponding to the external object 305 is rapidly moving from top to bottom (i.e., toward the preset direction DR). If so, the control component 130 then correspondingly controls the water supplying module 120 to discharge the real stream WA, and vice versa.

In one embodiment, after defining that the direction of the vector value is from top to bottom, the control component 130 may generate a signal for starting supplying the real stream after a predetermined second, wherein the water supplying signal includes the above-mentioned signal for starting to supply the real stream WA. Correspondingly, the control component 130 may control the water supplying module 120 to supply the real stream WA by the water supplying signal.

In other words, the user may trigger the smart water supply 100 to discharge the real stream WA corresponding to the water supplying signal by moving the hand down quickly, which is further described below with reference to FIG. 4A-FIG. 4C.

Figure 4C:
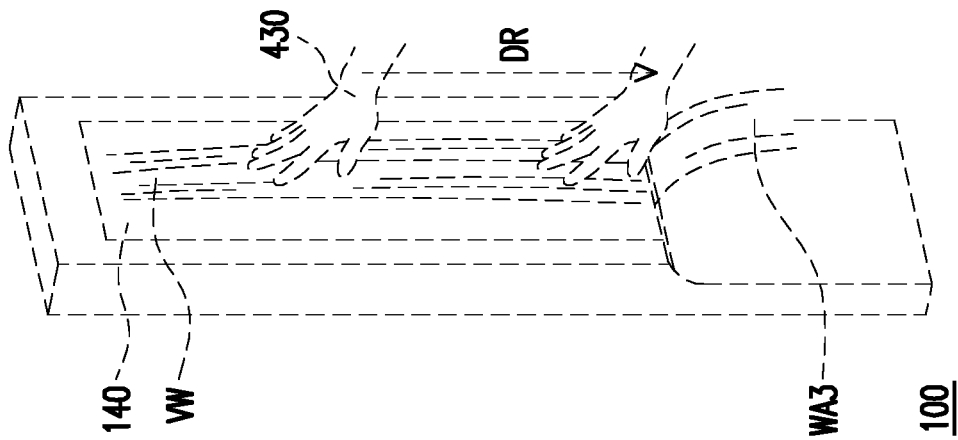
FIG. 4A-FIG. 4C are schematic views illustrating triggering a smart water supply to discharge a real stream according to various embodiments of the present disclosure.
Figure 4B:
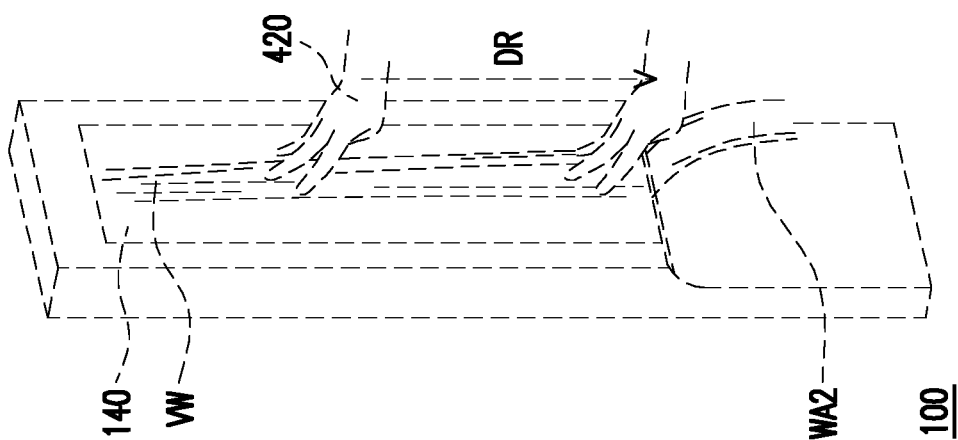
Figure 4A:
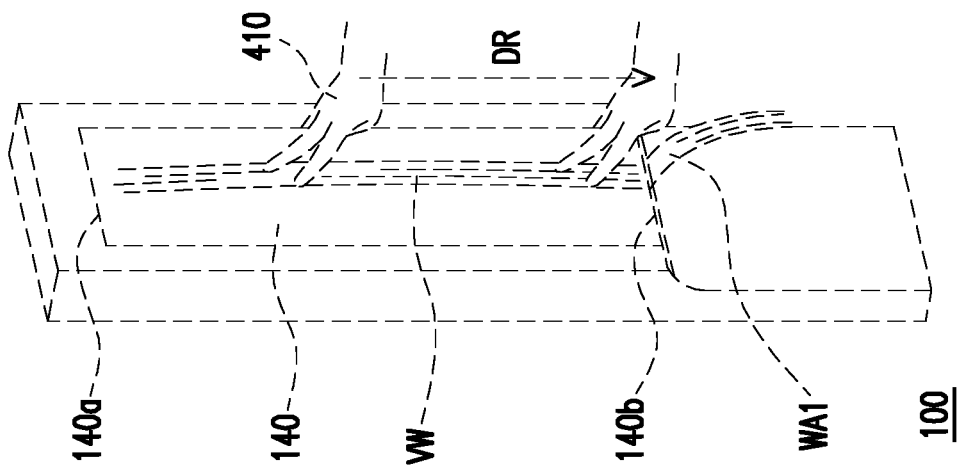

FIG. 4A-FIG. 4C are schematic views illustrating triggering a smart water supply to discharge a real stream according to various embodiments of the present disclosure. Referring to FIG. 4A, after the user quickly moves to the preset direction DR with the specific gesture 410 with two fingers, the smart water supply 100 may discharge the real stream WA1 correspondingly, and the water supply amount corresponding to the real stream WA1 may be 1 unit of water supply amount.

In addition, in the embodiment of FIG. 4A, before the smart water supply 100 discharges the real stream WA1, the control component 130 may also control the display module 140 to display a waterfall animation, wherein the waterfall animation includes a virtual stream VW (which is, for example, a virtual waterfall) pouring from the top portion 140*a* of the display module 140 to the bottom portion 140*b* of the display module 140. Moreover, when the virtual stream VW contacts the bottom portion 140*b* of the display module 140, the control component 130 may control the water supplying module 120 to start supplying the real stream WA1. That is, after the user inputs the gesture shown in FIG. 4A, the smart water supply 100 may first display the poured virtual stream VW on the display module 140, and then discharge the real stream WA1 through the water discharging component 1233 disposed under the bottom portion 140*b* when the virtual stream VW contacts the bottom portion 140*b* of the display module 140. In this manner, the user's visual experience in operating the smart water supply 100 can be enhanced.

Referring to FIG. 4B, after the user quickly moves to the preset direction DR with a specific gesture 420 with three fingers, the smart water supply 100 may discharge the real stream WA2 correspondingly, and the water supply amount corresponding to the real stream WA2 may be three units of water supply amount. Similar to FIG. 4A, the display module 140 of FIG. 4B may also display the virtual stream VW, and the aspect of the virtual stream VW may be presented as a wider water column in response to the water supply amount of the real stream WA2.

Referring to FIG. 4C, after the user quickly moves to the preset direction DR with a specific gesture 430 with five fingers, the smart water supply 100 may discharge the real stream WA3 correspondingly, and the water supply amount corresponding to the real stream WA3 may be 5 units of water supply amount. In FIG. 4C, the display module 140 may also display the virtual stream VW, and the aspect of the virtual stream VW may be presented as a wider water column in response to the water supply amount of the real stream WA3.

In one embodiment, after the smart water supply 100 discharges the real stream WA, the control component 130 may detect whether an object moves horizontally in the detection range RR at a rate greater than a preset rate. If so, the control component 130 may control the water supplying module 120 to stop supplying the real stream WA. In other words, the user may stop the real stream WA by quickly moving the gesture horizontally within the detection range RR, which is further described below with reference to FIG. 5.

Figure 5:
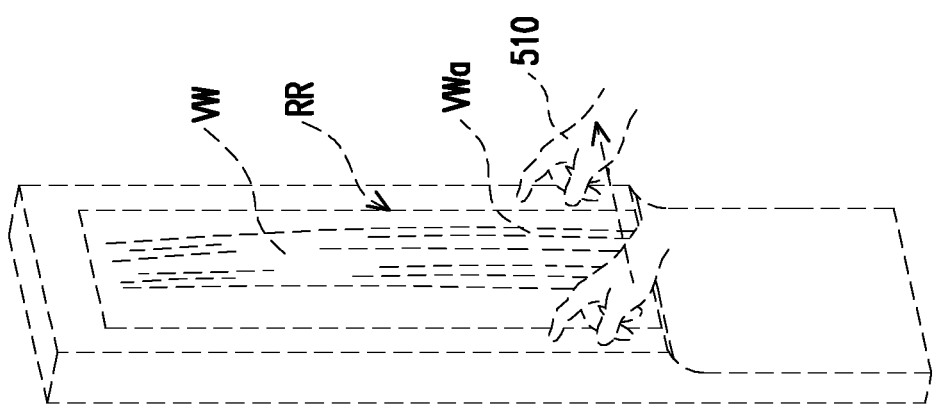
FIG. 5 is a schematic view illustrating controlling a water supplying module to stop supplying a real stream according to an embodiment of the present disclosure.

Please refer to FIG. 5, which is a schematic view illustrating controlling a water supplying module to stop supplying a real stream according to an embodiment of the present disclosure. In the present embodiment, after the user quickly moves horizontally within the detection range RR with a specific gesture 510, the smart water supply 100 may stop discharging the water correspondingly. In detail, the control component 130 may derive a vector value corresponding to the specific gesture 510 according to previous teachings. Moreover, after confirming that the direction of the vector value is horizontal and the vector value is greater than the predetermined vector value, the control component 130 may generate a signal for stopping supplying the real stream, wherein the water supplying signal includes the signal for stopping supplying the real stream. Correspondingly, the control component 130 may control the water supplying module 120 to stop supplying the real stream through the water supplying signal.

Moreover, in order to enhance the user's visual experience, the control component 130 may also display a cut-off mark VWa corresponding to the position of the specific gesture 510 on the virtual stream VW of the display module 140 to represent the concept of stopping the water discharge, but the disclosure is not limited thereto.

Further, based on the first embodiment, the present disclosure further provides a second embodiment which can adjust the water temperature according to the user's need, as is further explained below.

Figure 6A:
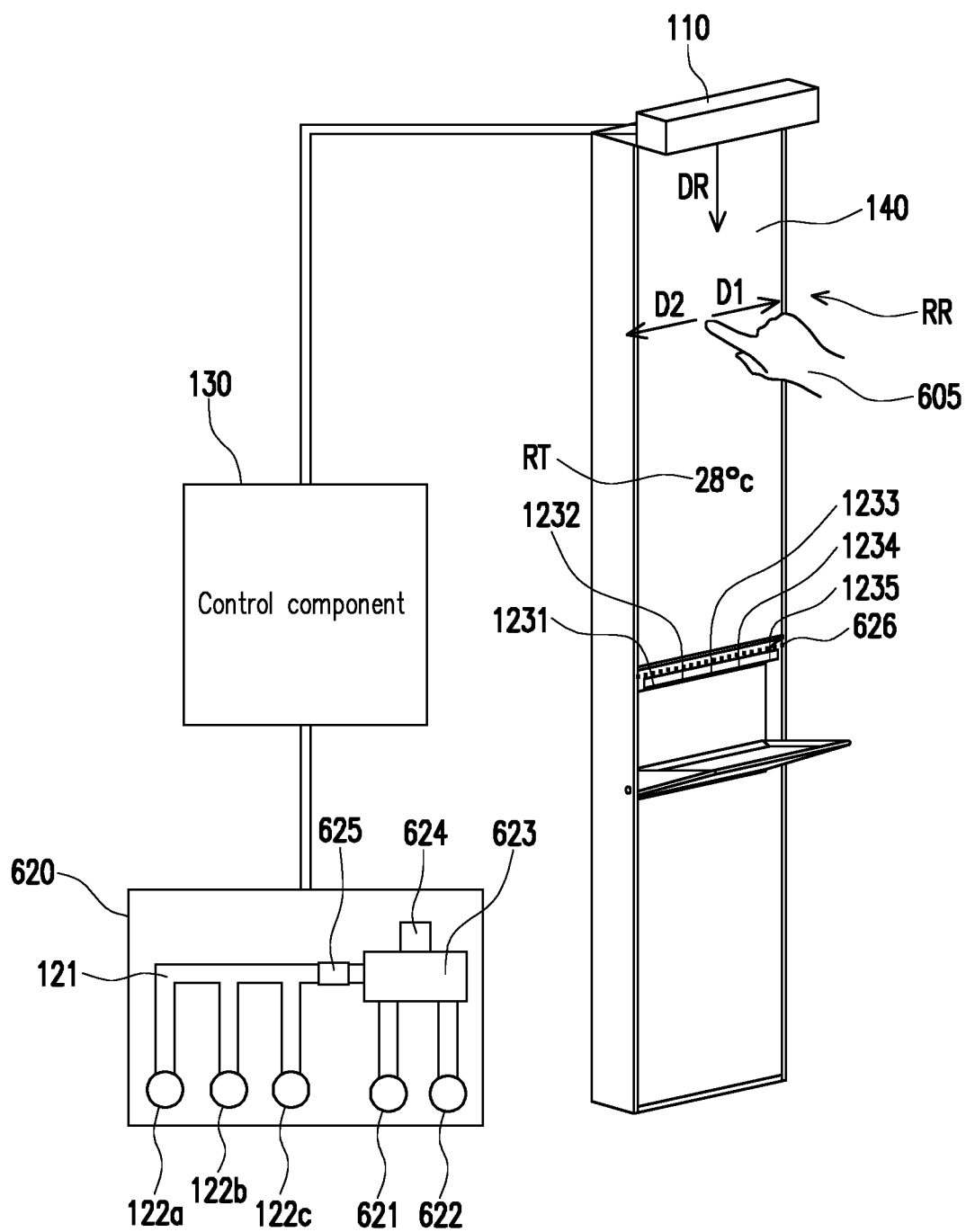
FIG. 6A is a schematic view illustrating a smart water supply according to a second embodiment of the present disclosure.
Figure 6B:
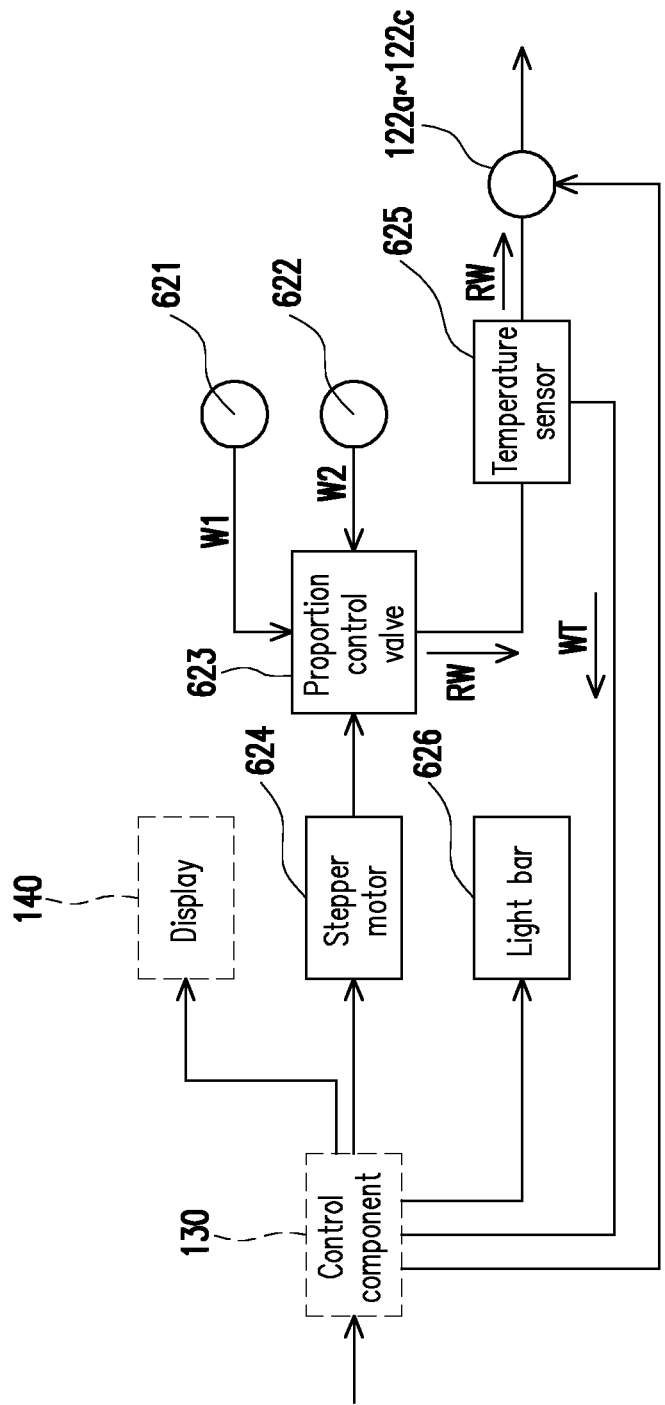
FIG. 6B is a schematic view illustrating a water supplying module according to FIG. 6A.

Referring to FIG. 6A and FIG. 6B, FIG. 6A is a schematic view illustrating a smart water supply 600 according to a second embodiment of the present disclosure, and FIG. 6B is a schematic view illustrating a water supplying module according to FIG. 6A. In the embodiment of FIG. 6A, the smart water supply 600 includes the object detecting module 110, the water supplying module 620, and the control component 130. Reference of the possible embodiments of the object detecting module 110 and the control component 130 may be derived from the first embodiment, and related descriptions are not be incorporated herein.

In the second embodiment, the water supplying module 620 may include a first water inlet 621, a second water inlet 622, a proportion control valve 623, a stepper motor 624, a temperature sensor 625, water outlet components 1231-1235, and electromagnetic valves 122*a*-122*c*, a multi-channel pipe 121 and a light bar 626. The first water inlet 621 may be connected to a first external water source to supply the first stream W1, and the second water inlet 622 may be connected to a second external water source to supply the second stream W2, wherein the temperature of the second stream W2 is lower than the first stream W1. Briefly, the first water inlet may be interpreted as a cold water inlet, and the second water inlet may be interpreted as a hot water inlet.

The proportion control valve 6223 may connect the first water inlet 621 and the second water inlet 622, and mix the first stream W1 and the second stream W2 into the mixed stream RW according to the adjusted proportion. The stepper motor 624 is electrically connected to the control component 130 and the proportion control valve 623, and is controlled by the control component 130 to drive the proportion control valve 623 to adjust the above proportion. The temperature sensor 625 is electrically connected to the control component 130 to sense the current temperature WT of the mixed water stream RW. The electromagnetic valves 122*a*-122*c* are electrically connected to the control component 130, and controlled by the control component 130 to be opened to supply the mixed water stream RW to the water outlet components 1231 to 1235, or closed to stop supplying the mixed water stream RW to the water outlet components 1231 to 1235, wherein the connection relationship between the electromagnetic valves 122*a*-122*c* and the water outlet components 1231-1235 may be derived from the related description of FIG. 1B, and details are not described herein again. The multi-channel pipe 121 has a water inlet and a plurality of water outlets, wherein the water inlet of the multi-channel pipe 121 receives the mixed stream RW, and the water outlet of the multi-channel pipe 121 is connected to the electromagnetic valves 122*a*-122*c*.

In FIG. 6A, when the object detecting module 110 detects the hand 605 (i.e., an external object) within the detection range RR, and the control component 130 defines the direction of the corresponding vector value as staying still, the control component 130 may generate a signal for setting the temperature of the real stream according to the last of the central coordinates of the hand 605, wherein the water supplying signal includes the signal for setting the temperature of the real stream. Correspondingly, the control component 130 may trigger the water supplying module 620 to enter a mechanism for adjusting the temperature of the real stream by the water supplying signal.

In one embodiment, the control component 130 may control the display module 140 to display a reference temperature RT (e.g., 28° C.). In various embodiments, the reference temperature RT may be a fixed temperature or a temperature corresponding to the current position of the hand 605. If the reference temperature RT is set as a fixed temperature, the display module 140 displays the same temperature regardless of the current position of the user's hand.

On the other hand, if the reference temperature RT is set as a temperature corresponding to the aforementioned current position, the temperature displayed by the display module 140 is set depending on the current position of the hand 605. For example, if the hand 605 corresponds to the position toward the right, the display module 140 may display a higher temperature (for example, 40° C.), and if the hand 605 corresponds to the position toward the left, the display module 140 may display a lower temperature (for example, 20° C.), but the disclosure is not limited thereto. In this example, the rightmost and leftmost horizontal coordinates of the display module 140 may be set as max and min, respectively. Assuming that the water temperature that the smart water supply 600 can provide is between 1° C. and J° C. (J is greater than I), the above reference temperature may be indicated as $(pt \cdot x - min)/((max - min)/(J - I))$, wherein $pt \cdot x$ is the horizontal coordinate of the hand 605, but the present disclosure is not limited thereto.

Thereafter, the control component 130 may determine the direction of the vector value corresponding to the hand 605 according to the approach taught previously. If the direction of the vector value is horizontal and the vector value is smaller than the predetermined vector value, the control component 130 may generate a signal for setting the temperature of the real stream according to the vector value, wherein the water supplying signal includes the signal for setting the temperature of the real stream.

Figure 7A:
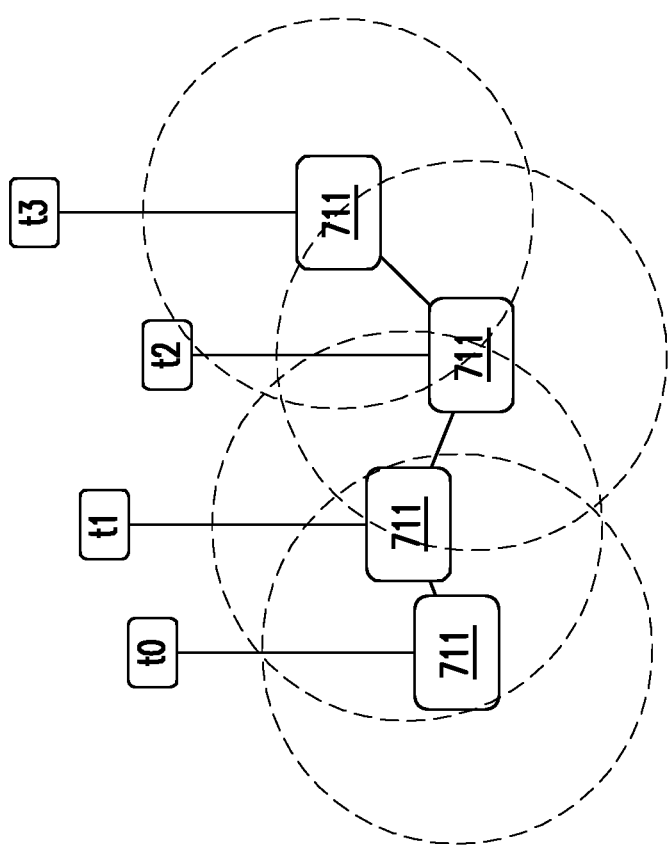
FIG. 7A is a schematic view illustrating tracking BLOB according to the second embodiment of the present disclosure.
Figure 7B:
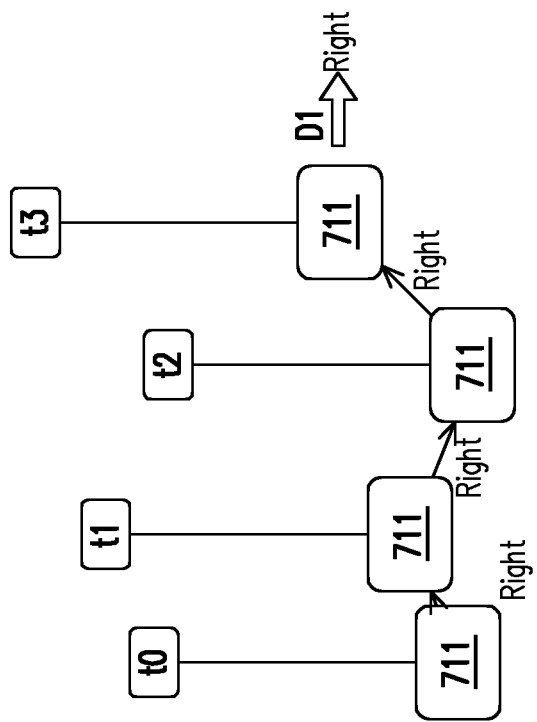
FIG. 7B is a schematic view illustrating determining the moving direction of BLOB in FIG. 7A.

In one embodiment, the control component 130 may detect the direction of the vector value of the hand 605 according to the mechanisms illustrated in the embodiments of FIG. 7A and FIG. 7B.

Please refer to FIG. 7A and FIG. 7B, FIG. 7A is a schematic view illustrating tracking BLOB according to the second embodiment of the present disclosure, and FIG. 7B is a schematic view illustrating determining the moving direction of BLOB in FIG. 7A. As shown in FIG. 7A, the control component 130 may control the object detecting module 110 (i.e., the depth camera) to capture a plurality of tracking images of the hand 605 at a plurality of consecutive time points t0, t1, t2, and t3, wherein each of the tracking images includes BLOB 711 corresponding to the hand 605. Next, the control component 130 may obtain the central coordinates of the BLOB 711 in each of the tracking images. If the first number of times that the horizontal coordinate of the central coordinate point of the BLOB 711 is increased at time points t0-t3 is larger than the second number of times that the horizontal coordinate of the central coordinate point of the BLOB 711 is decreased at time points t0-t3, the control component 130 may determine that the hand 605 move in the first direction D1, otherwise it is determined that the hand 605 is moves in the second direction D2.

Taking FIG. 7B as an example, the horizontal coordinate of the central coordinate point of BLOB 711 has increased by three times (i.e., moves to the right for three times) at time points t0 to t3 and decreased by zero time (i.e., moves to the left for zero time). Accordingly, the control component 130 determines that the hand 605 moves in the first direction D1 since the first number of times (i.e., three times) is larger than the second number of times (i.e., zero time).

In the second embodiment, when the hand 605 is detected to move toward the first direction D1 (e.g., the right side), the control component 130 may set the temperature adjustment parameter to be positively correlated with the positive value of the moving distance. That is, as the user moves the hand 605 further right, the temperature adjustment parameter generated by the control component 130 is a larger positive value.

On the other hand, when the hand 605 is detected to move toward the second direction D2 (e.g., the left side), the control component 130 may set the temperature adjustment parameter to be negatively correlated with the negative value of moving distance. That is, as the user moves the hand 605 further left, the temperature adjustment parameter generated by the control component 130 is a smaller negative value.

Thereafter, the control component 130 may add the reference temperature RT and the temperature adjustment parameter to produce a specified temperature. In one embodiment, the control component 130 may control the display module 140 to display the specified temperature for the user to determine whether the displayed specified temperature is the desired water temperature.

Next, the control component 130 may control the water supplying module 620 to adjust the water temperature of the stream to be a specified temperature. In one embodiment, when the specified temperature is higher than the current temperature WT of the mixed stream RW, the control component 130 may control the stepper motor 624 to rotate to drive the proportion control valve 623 to reduce the first water inlet amount of the first water inlet (i.e., reduce the amount of cold water) and correspondingly increase the second water inlet amount of the second water inlet (i.e., increase the amount of hot water) until the current temperature WT of the mixed water stream RW is equal to the specified temperature. On the other hand, when the specified temperature is lower than the current temperature WT of the mixed stream RW, the control component 130 may control the stepper motor 624 to rotate to drive the proportion control valve 623 to increase the first water inlet amount of the first external water source (i.e., increase the amount of cold water) and correspondingly reduce the second water inlet amount of the second external water source (i.e., reduce the amount of hot water) until the current temperature WT of the mixed water stream RW is equal to the specified temperature.

After the user completes the setting of the specified temperature, the smart water supply 600 may be controlled according to the teaching in the first embodiment to discharge a real stream having a specified temperature. For example, the user may use the gestures shown in FIG. 4A to FIG. 4C to control the smart water supply 600 to discharge the real stream with the specified temperature, and the amount of the real stream may be determined according to the number of fingers in the gesture, the details of which are not further described herein.

In addition, in one embodiment, the control component 130 may control the water supplying module 620 to discharge the stream after the water temperature of the stream is adjusted to the specified temperature to avoid waste of water resources.

In the second embodiment, the control component 130 may also control the light bar 626 to emit light according to the characteristic data or the water supplying signal. For example, the control component 130 may control the light bar 626 (e.g., an LED light bar) to display a color corresponding to a specified temperature, or a color corresponding to the water temperature of the real stream discharged by the smart water supply 600. That is, the control component 130 may control the light bar 626 to display a corresponding color at the moment that the user determines the specified temperature, or control the light bar 626 to display the corresponding color at the moment that the smart water supply 600 discharges the stream. In one embodiment, if the specified temperature is lower than 20° C., the light bar 626 may display blue color; if the specified temperature is between 20° C. and 30° C., the light bar 626 may display orange color; if the specified temperature is higher than 30° C., the light bar 626 may display red color, but the present disclosure is not limited thereto.

Figure 7C:
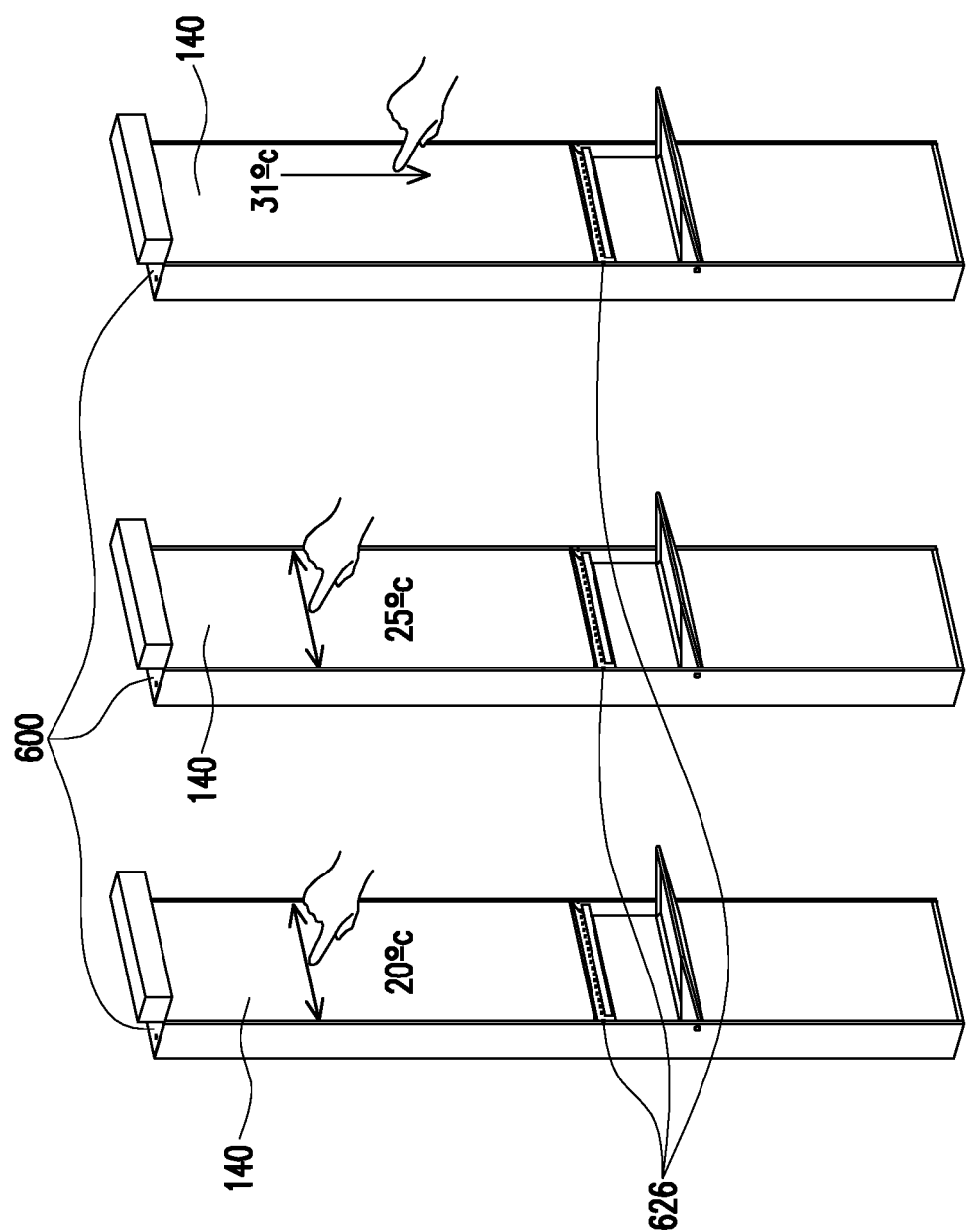
FIG. 7C is a plurality of schematic views illustrating regulating water temperature according to the second embodiment of the present disclosure.

Please refer to FIG. 7C, which is a plurality of schematic views illustrating regulating water temperature according to the second embodiment of the present disclosure. In FIG. 7C, it can be seen that when the user moves his/her hand to the left/right, the display module 140 may correspondingly display the specified temperature (for example, 20° C. and 25° C.), and the light bar 626 may also display the color corresponding to the specified temperature for the user to confirm. Moreover, after the user selects the specified temperature (for example, 31° C.), the user may control the smart water supply 600 to discharge the real stream with the specified temperature in the manner (for example, the manners in FIG. 4A to FIG. 4C) taught in the first embodiment.

As can be seen from the above, the embodiment of the present disclosure allows the user to adjust the water temperature of the real stream discharged by the smart water supply in a more intuitive and convenient way, thereby further enhancing the user experience.

Figure 8:
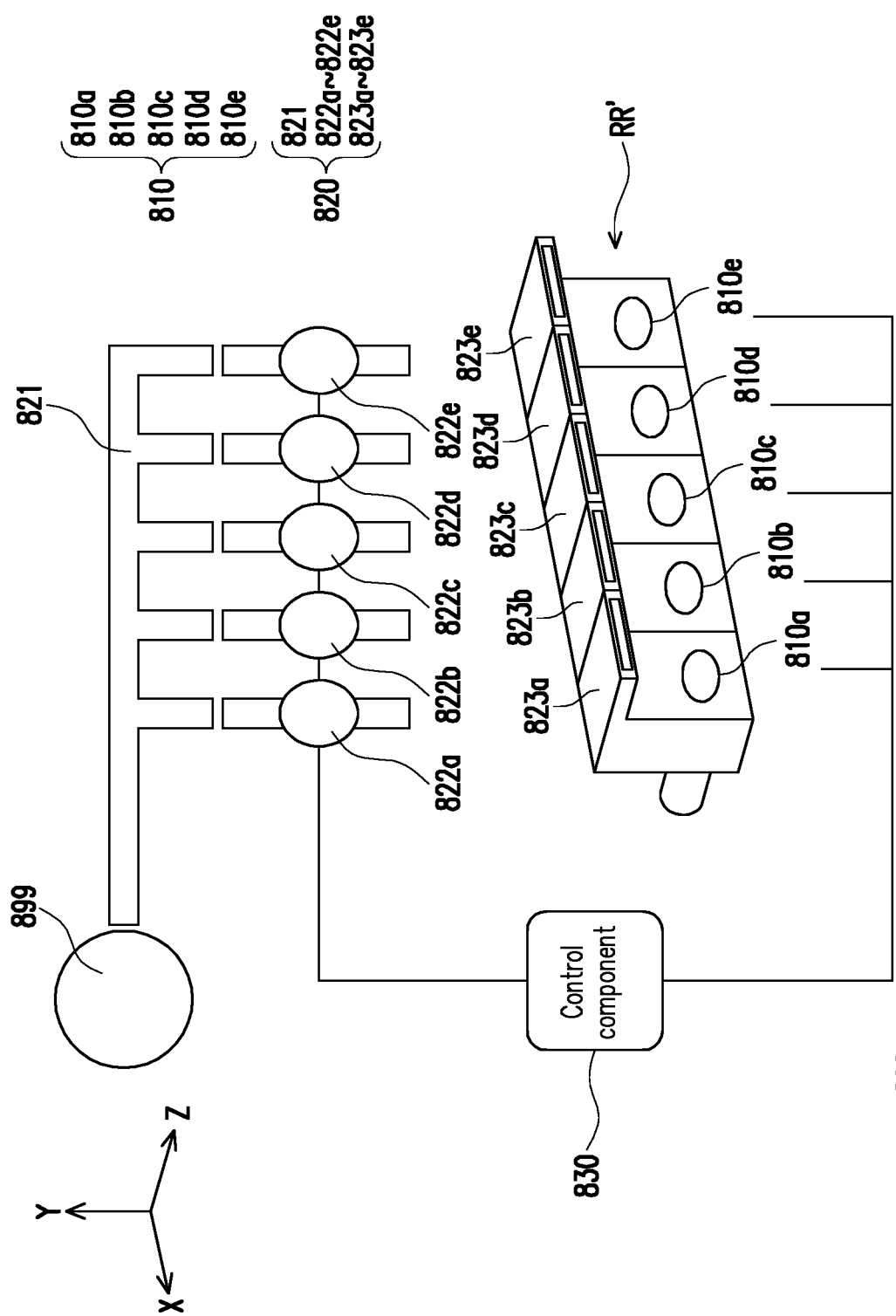
FIG. 8 is a schematic view of a smart water supply according to a third embodiment of the present disclosure.

Please refer to FIG. 8, which is a schematic view of a smart water supply according to a third embodiment of the present disclosure. In FIG. 8, a smart water supply 800 includes an object detecting module 810, a water supplying module 820, and a control component 830. In the third embodiment, the object detecting module 810 includes distance detectors 810*a*, 810*b*, 810*c*, 810*d* and 810*e*. The water supplying module 820 includes a multi-channel pipe 821, electromagnetic valves 822*a*, 822*b*, 822*c*, 822*d*, and 822*e*, and water outlet components 823*a*, 823*b*, 823*c*, 823*d*, and 823*e*. The multi-channel pipe 821 includes a water inlet and a plurality of water outlets, wherein the water inlet of the multi-channel pipe 821 is connected to the external water source 899. The electromagnetic valves 822*a*-822*e* are electrically connected to the control component 830, wherein each of the electromagnetic valves 822*a*-822*e* includes a water inlet and a water outlet, and the water inlet of each of the electromagnetic valves 822*a*-822*e* is connected to one of the water outlets of the multi-channel pipe 821. The water outlet components 823*a* to 823*e* are arranged in parallel, and each of the water outlet components 823*a* to 823*e* includes a water inlet and a water outlet, and the water inlet of each of the water outlet components 823*a* to 823*e* is separately connected to the water outlets of the electromagnetic valves 822*a* to 822*e*.

The distance detectors 810*a*-810*e* are separately disposed on the water outlet components 823*a*-823*e*, and the sensing range of each of the distance sensors 810*a*-810*e* collaboratively forms the detection range RR' of the smart water supply 800. In the third embodiment, each of the distance sensors 810*a* to 810*e* may perform sensing in the direction of +Z axis, which is the same as the water discharge direction of the water outlet of the respective water outlet components 823*a* to 823*e*.

In the third embodiment, the control component 830 may obtain the number and position of the distance sensor that detects the external object as the characteristic data. In one embodiment, the control component 830 may obtain a plurality of distance sensing values from the distance sensors 810*a*-810*e*, and looks up at least one value smaller than the distance threshold among the distance sensing values. The distance threshold is, for example, a reference distance value that may be used to determine whether an external object appears within the sensing range of each of the distance sensors 810*a*-810*e*, which may be determined by the designer according to needs.

For example, when only the distance sensing value detected by the distance sensor 810*a* is smaller than the foregoing distance threshold, it means that the external object appearing in the detection range RR' is only located within the sensing range of the distance sensor 810*a*, and the width of the external object is not big enough to cover two or more sensing ranges at the same time. In this case, the number of distance sensor that detects the external object is one, and the position of the distance sensor detecting the external object is the position corresponding to the distance sensor 810*a*.

In another example, when only the distance sensing values detected by the distance sensors 810*a* and 810*b* are smaller than the distance threshold, it represents that the external object appearing in the detection range RR' is only located within the sensing ranges of the distance sensors 810*a* and 810*b*, and the width of the external object is only wide enough to cover two sensing ranges simultaneously. In this case, the number of distance sensor detecting the external object is two, and the position of the distance sensor detecting the external object is the position corresponding to the distance sensors 810*a* and 810*b*.

Correspondingly, the control component 830 may obtain the number of other opened electromagnetic valves according to the number of distance sensors detecting the external object, wherein the water supplying signal includes the number of other opened electromagnetic valves. In one embodiment, the number of opened electromagnetic valves is positively correlated with the number of distance sensors that detect an external object. In another embodiment, the number of opened electromagnetic valves is equal to the number of distance sensors that detect an external object. For example, if the number of distance sensors detecting an external object is one, the control component 830 opens one electromagnetic valve; if the number of distance sensors detecting the external object is two, the control component 830 opens two electromagnetic valves, and so forth.

In one embodiment, the control component 830 may estimate the width of the external object according to the number of distance sensors that detect the external object. Thereafter, the control component 830 may generate a signal for adjusting the width of the real stream according to the width of the external object, wherein the characteristic data includes the width of the external object, and the water supplying signal includes the signal for adjusting the width of the real stream. Correspondingly, the control component 830 may control the water supplying module 820 to supply real stream having a corresponding width by using the water supplying signal.

Taking FIG. 8 as an example, assuming that only the distance sensors 810*a* and 810*b* detect an external object, the control component 830 may estimate that the width of the external object should be roughly wide enough to be detected by the distance sensors 810*a* and 810*b* at the same time. Thereafter, control component 830 may correspondingly generate a signal for adjusting the width of the real stream. In this embodiment, the signal may, for example, simultaneously control the opening of the electromagnetic valves 822*a* and 822*b* corresponding to the distance sensors 810*a* and 810*b*, so that the water outlet components 823*a* and 823*b* collaboratively supply real stream, and the width of the real stream corresponds to the width of the external object.

Figure 9A:
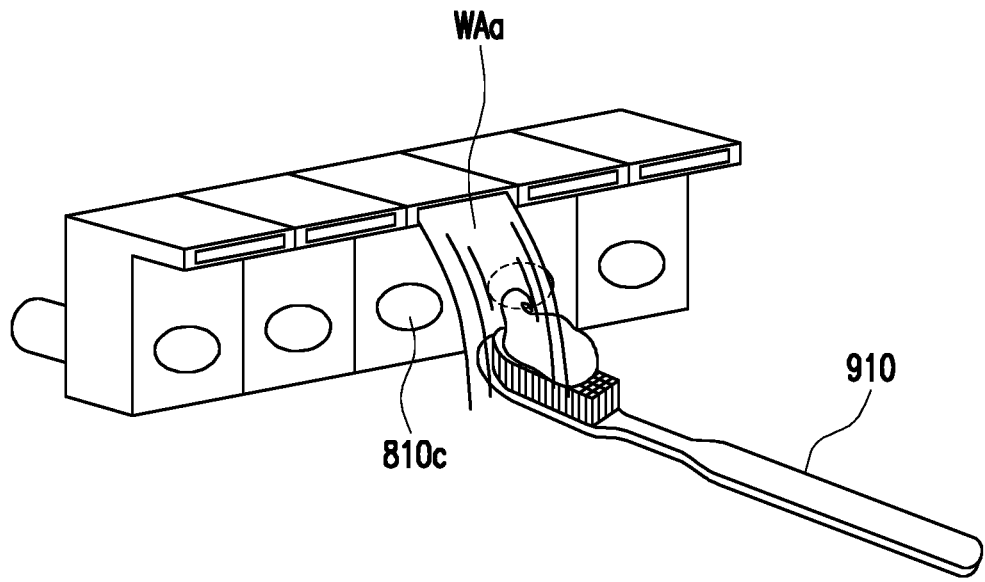
FIG. 9A to FIG. 9D are schematic views illustrating adjusting the width of a real stream according to the width of an external object according to a third embodiment of the present disclosure.

Please refer to FIG. 9A to FIG. 9D, which are schematic views illustrating adjusting the width of a real stream according to the width of an external object according to a third embodiment of the present disclosure. In FIG. 9A, assuming that only the distance sensor 810*c* detects the external object 910, the control component 830 may open the electromagnetic valve 822*c* corresponding to the distance sensor 810*c* to control the water outlet component 823*c* to supply the real stream WAa, wherein the width of the real stream WAa corresponds to the width of the external object 910.

Figure 9B:
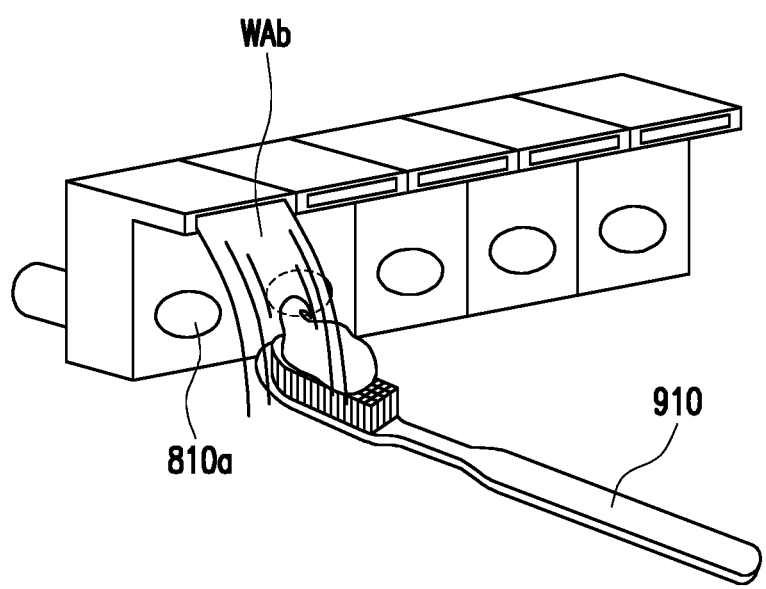

In FIG. 9B, assuming that only the distance sensor 810*a* detects the external object 910, the control component 830 may open the electromagnetic valve 822*a* corresponding to the distance sensor 810*a* to control the water outlet component 823*a* to supply the real stream WAb, wherein the width of the real stream WAb also corresponds to the width of the external object 910.

Figure 9C:
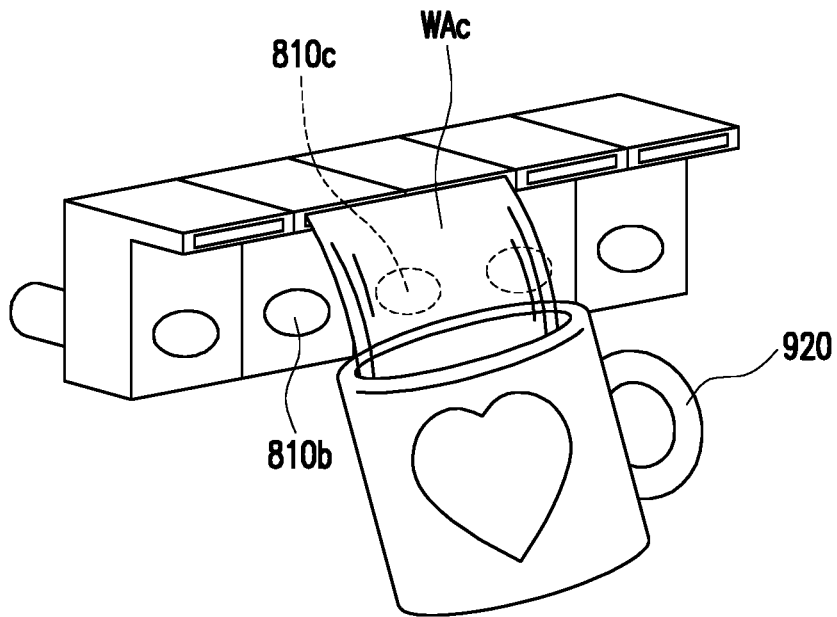

In FIG. 9C, assuming that only the distance sensors 810*b* and 810*c* detect the external object 920, the control component 830 may open the electromagnetic valves 822*b* and 822*c* corresponding to the distance sensors 810*b* and 810*c* to control the water outlet components 823*b* and the 823*c* to collaboratively supply the real stream WAc, wherein the width of the real stream WAc corresponds to the width of the external object 920.

Figure 9D:
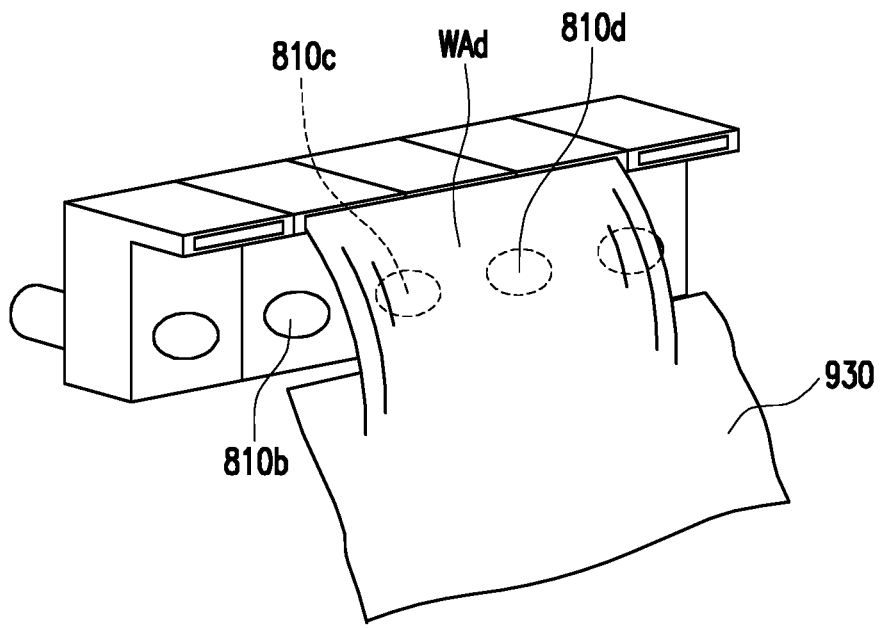

In FIG. 9D, assuming that only the distance sensors 810*b*-810*d* detect the external object 930, the control component 830 may open the electromagnetic valves 822*b*-822*d* corresponding to the distance sensors 810*b*-810*d* to control the water outlet components 823*b*-823*d* to collaboratively supply a real stream WAd, wherein the width of the real stream WAd corresponds to the width of the external object 930.

As can be seen from the above, the third embodiment of the present disclosure not only can adjust the width of the real stream according to the width of the external object, the water discharging position of the smart water supply may also be set depending on the current position of the external object. In this case, the user only needs to move the external object to be washed into the detection range of the smart water supply, and the smart water supply can make the corresponding water outlet component to collaboratively discharge a stream that is wide enough to cover the width of the external object. In this manner, the user can operate the smart water supply in a more intuitive and convenient manner, and also avoid waste of water resources.

Figure 10A:
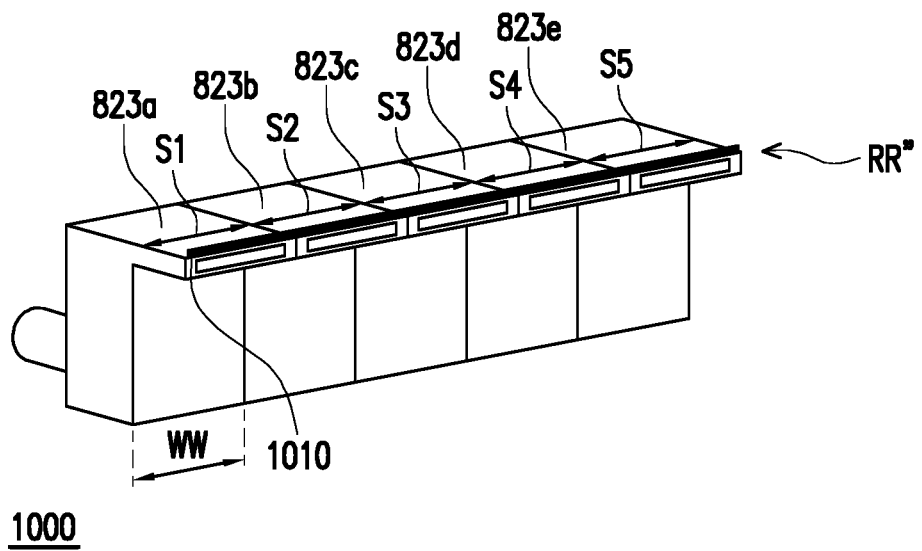
FIG. 10A is a schematic view of another smart water supply according to the third embodiment of the present disclosure.

Please refer to FIG. 10A, which is a schematic view of another smart water supply according to the third embodiment of the present disclosure. In the present embodiment, the smart water supply 1000 differs from the smart water supply 800 of FIG. 8 in that the distance sensor 1010 in the smart water supply 1000 is, for example, a strip-shaped distance sensor that may be disposed on the water outlet of the water outlet components 823a-823e and may generate a distance sensing value array. As shown in FIG. 10A, the sensing range of the distance sensor 1010 may form a detection range RR" of the smart water supply 1000, and the sensing range of the distance sensor 1010 may be divided into a plurality of sensing segments S1, S2, S3, S4 and S5 corresponding to the surface width of each of the water outlet components 823a-823e.

In the embodiment of FIG. 10A, the control component 830 may obtain a distance sensing value array of the distance sensor 1010 and look up a corresponding portion of the external object in the sensing segments S1-S5 according to the distance sensing value array. For ease of explanation, the following embodiment is described with reference to FIG. 10B.

Figure 10B:
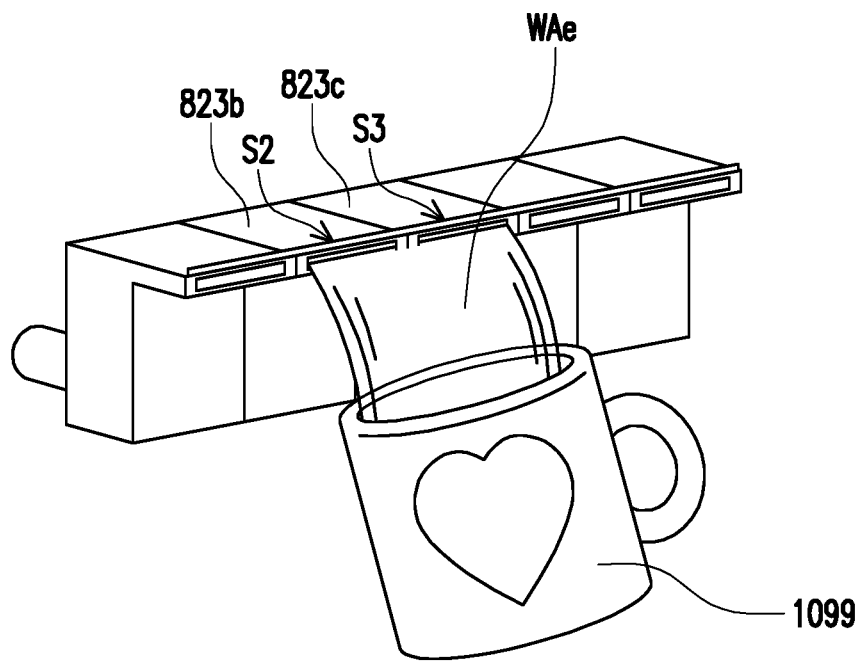
FIG. 10B is a schematic view illustrating supplying a real stream according to the width of an external object by the smart water supply in FIG. 10A.

Please refer to FIG. 10B, which is a schematic view illustrating supplying a real stream according to the width of an external object by the smart water supply in FIG. 10A. In FIG. 10B, after the distance sensor 1010 detects the external object 1099, a distance sensing value array is generated correspondingly, and the control component 830 may look up the corresponding portion of the external object 1099 in the sensing segments S1-S5, namely the sensing segments S2 and S3.

Thereafter, the control component 830 may estimate the width of the external object 1099 according to the first number of the corresponding portions of the external object 1099 in the sensing segments S1-S5, wherein the width of the external object 1099 is the first product of the first number and the preset width. Taking FIG. 10B as an example, since the external object 1099 corresponds to the sensing segments S2 and S3, it can be obtained that the first number is two. In this manner, it is assumed that the predetermined width is the surface width WW of each of the water outlet components 823a to 823e, and therefore the control component 830 may estimate that the width of the external object 1099 is two times the preset width, that is, two times the surface width WW.

Next, the control component 830 may set the water discharging amount to be the second product of the second number of a portion of the water outlet components 823a-823e and the unit of water supply amount, wherein the portion of the water outlet components 823a-823e corresponds to the corresponding portion of the external object in the sensing segments S1-S5. Taking FIG. 10B as an example, since the external object 1099 corresponds to the sensing segments S2 and S3 in the sensing segments S1 to S5, the portions of the water outlet components 823a to 823e are the water outlet components 823b and 823c corresponding to the sensing segments S2 and S3. That is, the second number is two, and the second product is two units of water supply amount.

Thereafter, the control component 830 may open a portion of the electromagnetic valves 822a-822e to control the portions of the water outlet components 823a-823e to supply a unit stream separately according to the unit of water supply amount, wherein the portions of the electromagnetic valves 822a-822e correspond to the portions of the water outlet components 823a-823e. Taking FIG. 10B as an example, since the portions of the water outlet components 823a-823e are the water outlet components 823b and 823c, and the corresponding electromagnetic valves are 822b and 822c, the control component 830 may open the electromagnetic valves 822b and 822c to control the water outlet components 823b and 823c to supply a unit stream separately according to the unit of water supply amount, thereby forming real stream WAe corresponding to two units of water supply amount.

In addition, in other embodiments, the structure shown in FIG. 10A can also achieve the technical effects as shown in FIG. 9A-FIG. 9D. That is, not only that the water supply amount may be adjusted according to the width of the external object, but also the water discharging position of the smart water supply 1000 may be set depending on the current position of the external object. For example, if the external object 1099 of FIG. 10B moves to the right by a distance of a surface width WW, the smart water supply 1000 may correspondingly supply the real stream WAe by the water outlet components 823c and 823d. In another example, if the external object 930 in FIG. 9D is used to trigger the smart water supply 1000, the smart water supply 1000 may correspondingly supply the corresponding stream by the water outlet components 823b-823d.

Figure 11A:
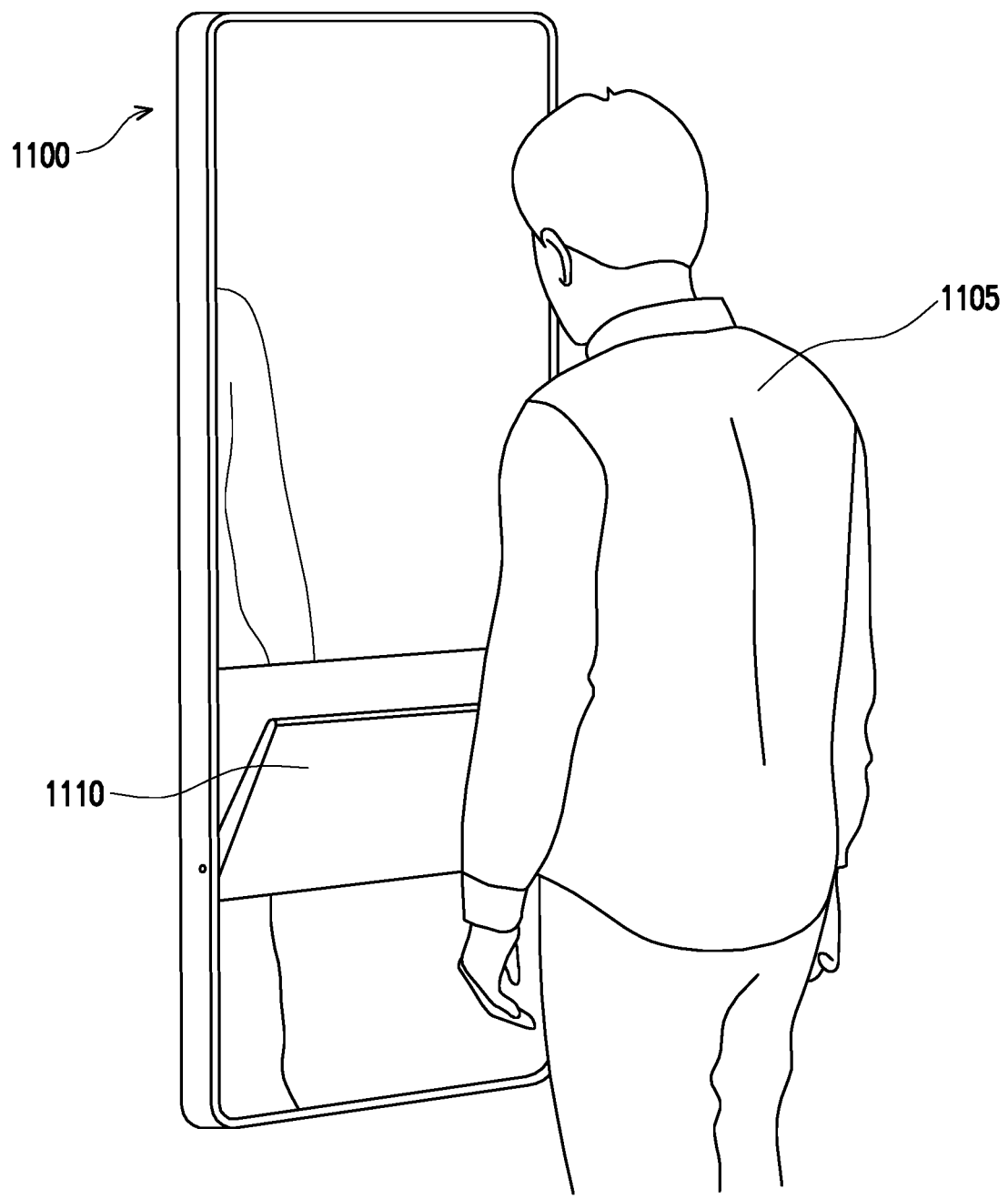
FIG. 11A is a schematic view illustrating opening a water tank according to characteristic data according to a fourth embodiment of the present disclosure.

In order to make the application circumstance of the present disclosure more comprehensible, the following embodiment is further described with reference to FIG. 11A to FIG. 11H. Please refer to FIG. 11A, which is a schematic view illustrating opening a water tank according to characteristic data according to a fourth embodiment of the present disclosure. In FIG. 11A, the smart water supply 1100 not only may include the components included in the smart water supply 100, 600 mentioned in the previous embodiment, but also may include a water tank 1110, which may be used to receive the real stream discharged by the smart water supply 1100. As shown in FIG. 11A, when the object detecting module (not labeled) of the smart water supply 1100 detects an external object 1105 (for example, a human body), the control component (not labeled) of the smart water supply 1100 may correspondingly open the water tank 1100.

Figure 11B:
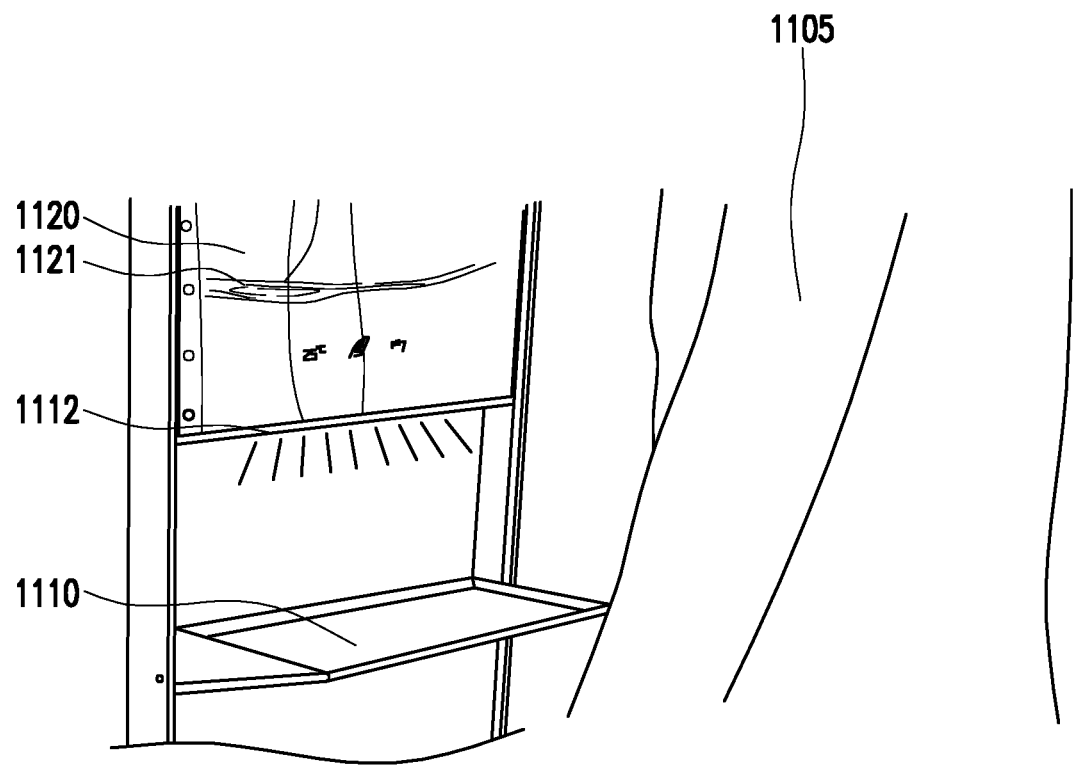
FIG. 11B is a schematic view illustrating controlling light bar illumination and controlling a display module to display virtual stream according to FIG. 11A.

Please refer to FIG. 11B, which is a schematic view illustrating controlling light bar illumination and controlling a display module to display virtual stream according to FIG. 11A. As shown in FIG. 11B, after the water tank 1100 is opened, the control component of the smart water supply 1100 may control the light bar 1112 to emit light in response to the detected characteristic data. Moreover, the control component of the smart water supply 1100 may also control the display module 1120 to display the virtual stream 1121. In the present embodiment, the illumination of the light bar 1112 and the aspect of the virtual stream 1114 may be independent of the water supplying signal of the smart water supply 1100.

Figure 11C:
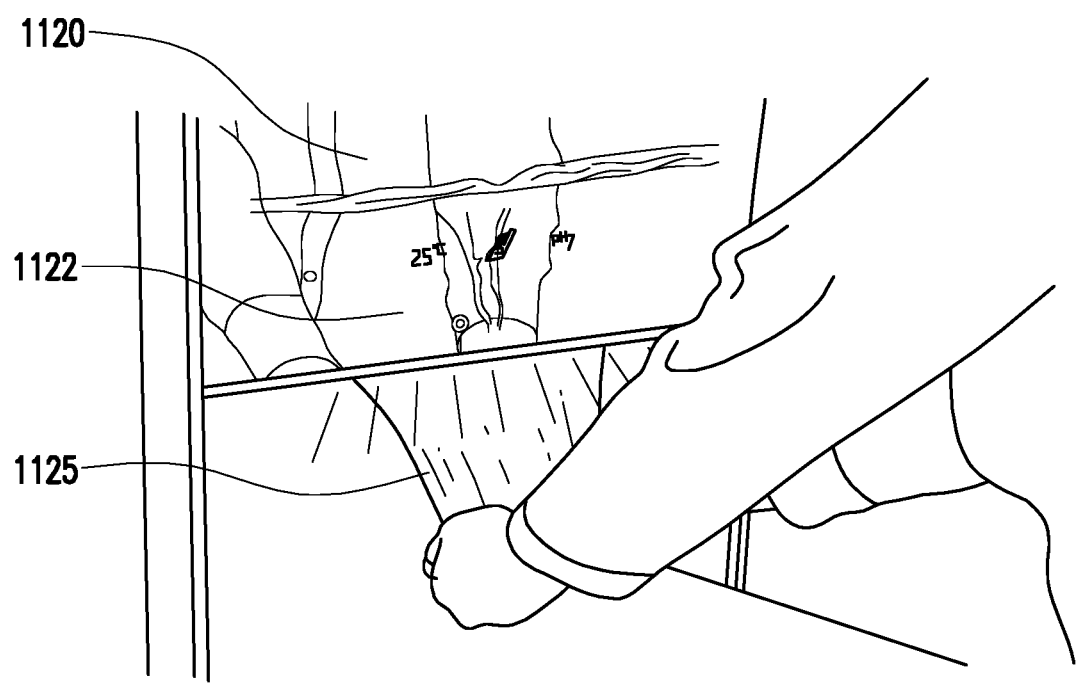
FIG. 11C is a schematic view illustrating supplying a real stream according to FIG. 11B.

Please refer to FIG. 11C, which is a schematic view illustrating supplying a real stream according to FIG. 11B. In the present embodiment, the user may, for example, control the smart water supply 1100 to supply the real stream 1125 according to the manner taught in FIG. 4A-FIG. 4C. Moreover, when the smart water supply 1100 actually discharges the real stream 1125, the display module 1120 may also be controlled to change the virtual stream 1121 shown in FIG. 11B into the virtual stream 1122 shown in FIG. 11C (which is, for example, a virtual lateral vortex), thereby providing additional user-related visual experiences. In other embodiments, the aspect of the virtual stream 1122 may also be implemented as a plurality of rising bubbles, but the present disclosure is not limited thereto.

Figure 11D:
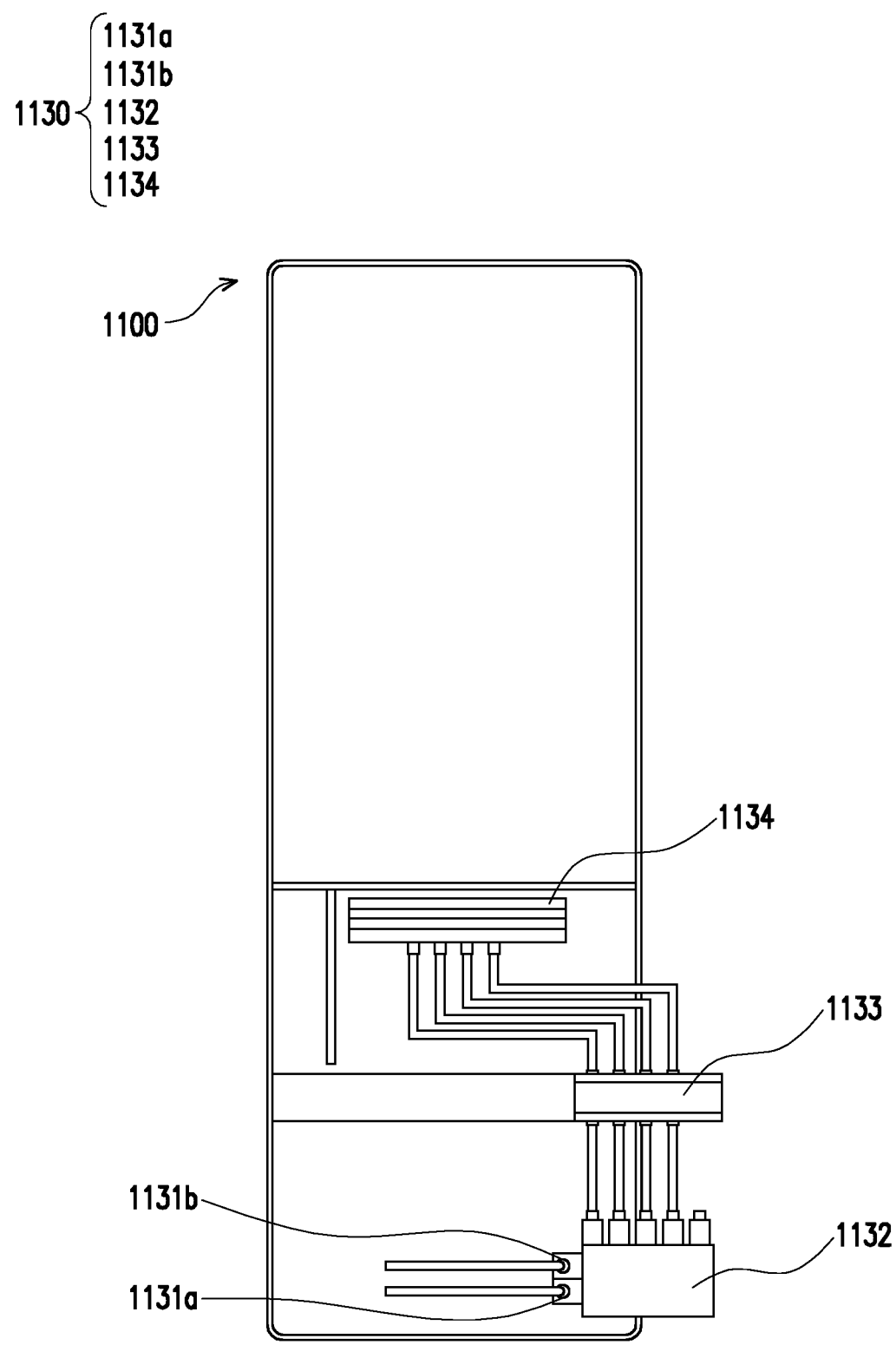
FIG. 11D is a schematic view illustrating a water supplying module according to FIG. 11A.

Please refer to FIG. 11D, which is a schematic view illustrating a water supplying module according to FIG. 11A. In the present embodiment, the smart water supply 1100 includes a water supplying module 1130, which may include a first water inlet 1131a, a second water inlet 1131b, a proportion control valve 1132, a mixing valve 1133, and a water outlet component 1134. In FIG. 11D, the first water inlet 1131a and the second water inlet 1131b may be respectively used to supply a first stream (e.g., cold water) and a second stream (e.g., hot water). The proportion control valve 1132 (which is, for example, a thermostatic valve) may adjust the proportion of the first stream to the second stream according to the mechanisms taught in the previous embodiments. Thereafter, the mixing valve 1133 connected between the water outlet component 1134 and the proportion control valve 1132 may mix the first stream and the second stream into a mixed stream according to the above proportion, and supply the mixed stream to the water outlet component 1134 to use the mixed stream as the real stream to be discharged.

In various embodiments, the water supplying module illustrated in FIG. 11D may supply real stream for different purposes depending on the characteristics of the first stream and the second stream. For example, if the first water stream and the second water stream are non-potable water, the real stream discharged by the water outlet component 1134 in FIG. 11D is non-potable water. However, if the first stream and the second stream are drinking water, the real stream discharged by the water outlet component 1134 is drinking water.

Figure 11E:
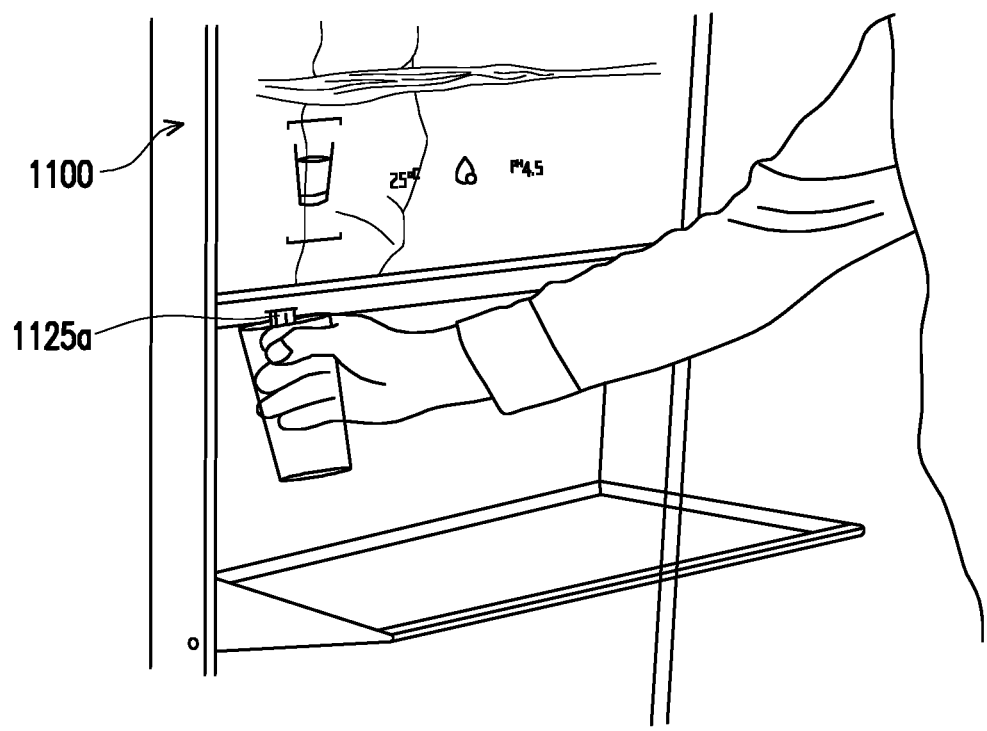
FIG. 11E is a schematic view illustrating supplying drinking water according to FIG. 11D.

Please refer to FIG. 11E, which is a schematic view illustrating supplying drinking water according to FIG. 11D. In the present embodiment, assuming that both the first stream and the second stream in FIG. 11D are drinking water, and the corresponding mixed stream may be discharged as a real stream 1125a for the user to drink.

That is, the smart water supply 1100 may include a water supplying module (the structure may be similar to the water supplying module 1130, except that the first stream and the second stream considered are non-potable water) for discharging the real stream 1125 as non-potable water, and a water supplying module 1130 for discharging the real stream 1125a as drinking water.

In other embodiments, the smart water supply 1100 may additionally include a drinking water module that may be correspondingly activated to supply drinking water when the external object is detected. The mechanism for detecting an external object may be derived from the teachings in the previous embodiments, and will not be further described herein.

Figure 11F:
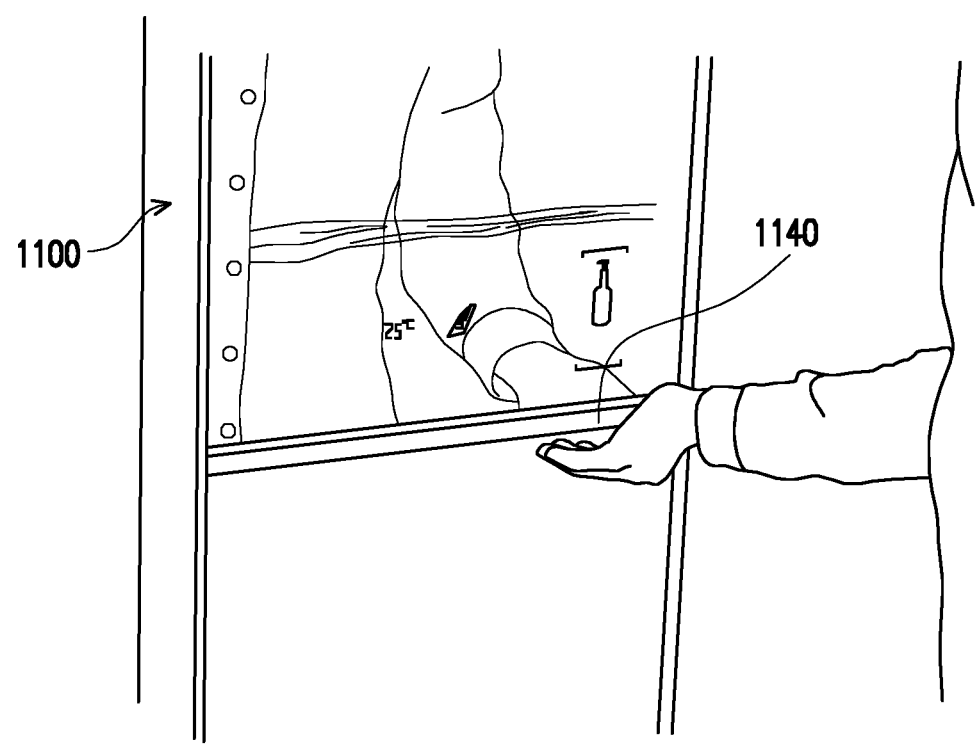
FIG. 11F is a schematic view illustrating a soap dispensing mechanism according to a fourth embodiment of the present disclosure.

Please refer to FIG. 11F, which is a schematic view illustrating a soap dispensing mechanism according to a fourth embodiment of the present disclosure. In this embodiment, the smart water supply 1100 may further include a soap dispensing module 1140 that may be used to supply a soap liquid or a soap. For example, the soap dispensing module 1140 may automatically supply soap liquid or soap after detecting that an external object (e.g., the user's hand) approaches for the user to wash their hands. The mechanism for detecting an external object may be derived from the teachings in the previous embodiments, and will not be further described herein.

Figure 11G:
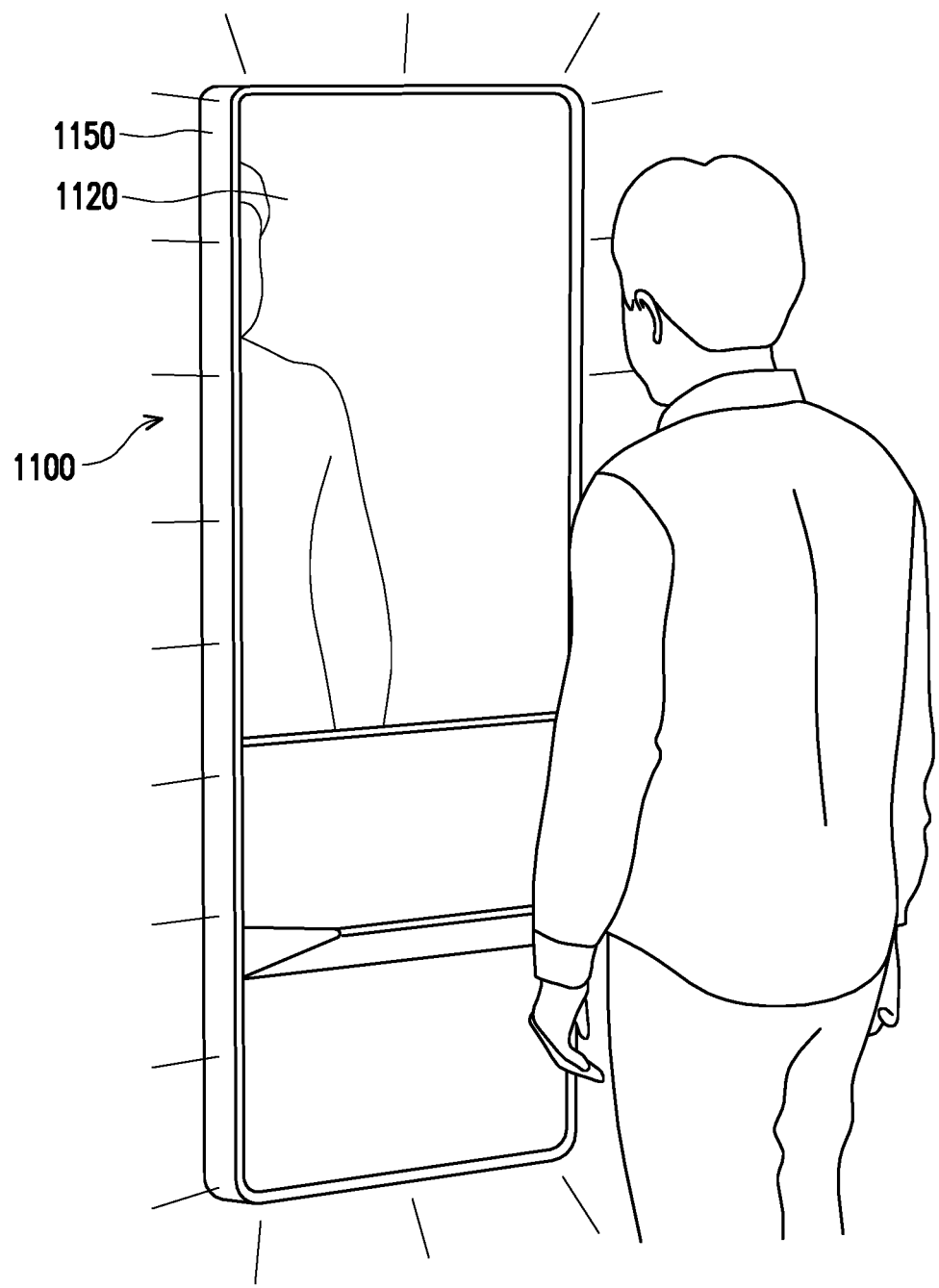
FIG. 11G is a schematic view illustrating a smart water supply according to the fourth embodiment of the present disclosure.

Please refer to FIG. 11G, which is a schematic view illustrating a smart water supply according to the fourth embodiment of the present disclosure. In the present embodiment, the smart water supply 1100 may be provided with a light bar 1150, which may be disposed outside the display module 1120 in a circular arrangement and emit light at a specified timing. Taking FIG. 11G as an example, when the display module 1120 is displaying information for the user to view, the light bar 1150 may emit light correspondingly, but the present disclosure is not limited thereto.

Figure 11H:
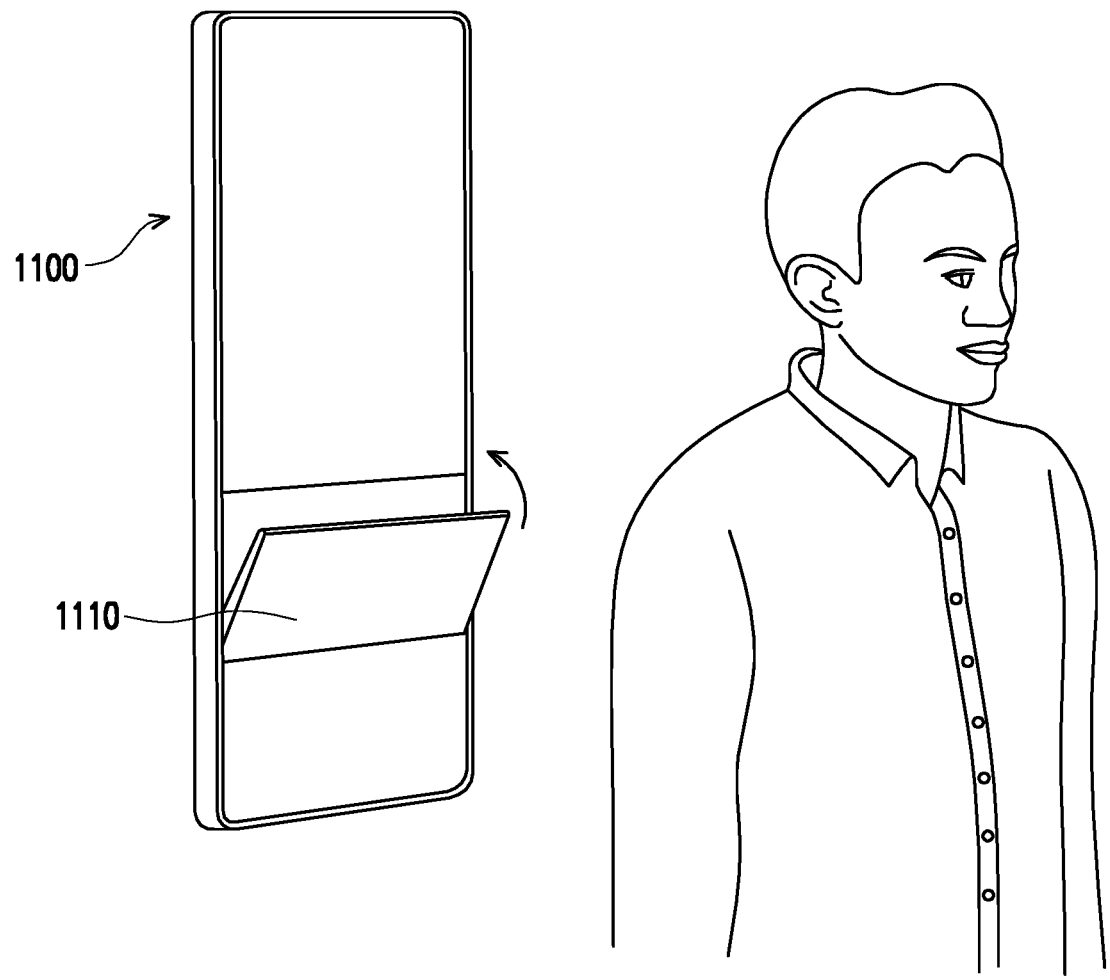
FIG. 11H is a schematic view illustrating closing a water tank according to the fourth embodiment of the present disclosure.

Please refer to FIG. 11H, which is a schematic view illustrating closing a water tank according to the fourth embodiment of the present disclosure. As shown in FIG. 11H, when the object detecting module of the smart water supply 1100 does not detect an external object, the control component of the smart water supply 1100 may correspondingly close the water tank 1100.

In summary, the first embodiment of the present disclosure may correspondingly adjust the width of the discharged real stream after estimating the volume of the external object appearing within the detection range, so that the user can operate the smart water supply in a more intuitive, convenient and novel way. For example, the user may adjust the water supply amount of the real stream through intuitively adjusting the number of fingers in the gesture within the detection range, so that the smart water supply can directly discharge the stream with the water supply amount that meets the user's need. Moreover, the virtual stream displayed on the display module provides the user with an additional visual experience while using water.

In addition, the second embodiment of the present disclosure provides an interface for the user to adjust the water temperature when detecting that the external object stays still at the current position, so that the user can adjust the water temperature of the stream discharged by the smart water supply in a more intuitive and convenient way.

Furthermore, the third embodiment of the present disclosure may correspondingly adjust the water supply amount and the water discharging position after estimating the width of the external object appearing within the detection range. In this case, the user only needs to move the external object to be washed in the detection range of the smart water supply, and the smart water supply makes the corresponding water outlet component to collaboratively discharge a stream wide enough to cover the external object. In this manner, the user can operate the smart water supply in a more intuitive and convenient way, and also avoid waste of water resources.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. A smart water supplying method, comprising:
   detecting an external object to obtain a plurality of detection data;
   estimating at least one characteristic data of the external object according to the detection data, comprising:
   binarizing a depth signal of a combined image to generate a binarized image;
   obtaining A profile coordinates in the binarized image through a convex hull algorithm, wherein A is an integer;
   retrieving four profile coordinates having maximum and minimum X, Y coordinate values from the A profile coordinates;
   generating a rectangular object according to the four profile coordinates; and calculating a central coordinate of the rectangular object according to the four profile coordinates;
determining at least one water supplying signal according to the characteristic data of the external object; and
supplying a real stream according to the water supplying signal.

2. The method according to claim 1, further comprising:
providing at least one electromagnetic valve to control the real stream.

3. The method according to claim 2, further comprising:
providing a depth camera for capturing at least one image of the external object.

4. The method according to claim 3, further comprising:
analyzing the image to obtain the number of at least one specific profile coordinate;
wherein the characteristic data comprises the number of the specific profile coordinate.

5. The method according to claim 4, further comprising:
obtaining a number of opening the electromagnetic valve according to the number of the specific profile coordinate;
wherein the water supplying signal comprises the opening number.

6. The method according to claim 5, wherein the opening number is positively correlated with the number of the specific profile coordinate.

7. The method according to claim 5, wherein the number of the specific profile coordinate is larger than or equal to 1, and smaller than or equal to 10.

8. The method according to claim 4, wherein the image comprises an infrared image and a depth image.

9. The method according to claim 8, further comprising:
utilizing the depth image as a mask; and
combining the mask with the infrared image to generate the combined image;
wherein the combined image has the depth signal.

10. The method according to claim 1, further comprising:
retrieving, from the A profile coordinates, M profile coordinates having a Y coordinate value larger than a Y coordinate value of the central coordinate, wherein M is an integer;
deducting the Y coordinate value of the M coordinate coordinates from a maximum Y coordinate value to obtain M Y coordinate differences; and
retrieving, from the M profile coordinates, N profile coordinates having a Y coordinate difference smaller than a first threshold.

11. The method according to claim 10, further comprising:
calculating N−1 X coordinate differences between adjacent N profile coordinates, wherein N is an integer;
determining whether N−1 X coordinate differences are larger than a second threshold; and
retrieving B profile coordinate from N profile coordinates, wherein B is an integer;
wherein the B profile coordinate is the specific profile coordinate.

12. The method according to claim 11, wherein if an X coordinate difference is smaller than the second threshold, the adjacent profile coordinates are merged, and the profile coordinate having larger Y coordinate value is retrieved.

13. The method according to claim 11, wherein if an X coordinate difference is larger than the second threshold, the adjacent profile coordinates are retrieved.

14. The method according to claim 1, further comprising:
analyzing the image to obtain a vector value.

15. The method according to claim 14, further comprising:
obtaining a plurality of rectangular objects and a plurality of central coordinates through a shortest distance tracking method;
calculating adjacent central coordinate difference to obtain a plurality of instantaneous motion vectors;
performing a direction classification and number accumulation on the plurality of instantaneous motion vectors according to X and Y coordinate values of the plurality of instantaneous motion vectors;
defining the direction classification with the largest accumulation number as a direction of the vector value.

16. The method according to claim 15, wherein the direction classification comprises top to bottom, staying still, and horizontal.

17. The method according to claim 16, further comprising:
defining the direction of the vector value as top to bottom; and
generating a signal for starting supplying a real stream after a predetermined second;
wherein the water supplying signal comprises the signal for starting supplying the real stream.

18. The method according to claim 16, further comprising:
defining the direction of the vector value as staying still; and
generating a signal for setting a temperature of a real stream according to the last one of the central coordinate;
wherein the water supplying signal comprises the signal for setting the temperature of the real stream.

19. The method according to claim 16, further comprising:
defining the direction of the vector value to be horizontal;
confirming that the vector value is smaller than a predetermined vector value; and
generating a signal for setting a temperature of a real stream according to the vector value;
wherein the water supplying signal comprises the signal for setting the temperature of the real stream.

20. The method according to claim 16, further comprising:
defining that the direction of the vector value is horizontal;
confirming that the vector value is larger than a predetermined vector value; and
generating a signal for stopping supplying a real stream;
wherein the water supplying signal comprises the signal for stopping supplying the real stream.

21. The method according to claim 2, further comprising:
providing at least one distance sensor for detecting the external object; and
obtaining the number and position of a distance sensor detecting the external object;
wherein the characteristic data comprises the number and position of the distance sensor detecting the external object.

22. The method according to claim 21, further comprising:
obtaining another number of opening electromagnetic valves according to the number of the distance sensor detecting the external object;
wherein the water supplying signal comprises said another number of opening the electromagnetic valves.

23. The method according to claim 22, wherein the number of opening the electromagnetic valves is positively correlated with the number of distance sensor detecting the external object.

24. The method according to claim 22, wherein the number of opening the electromagnetic valves is equal to the number of the distance sensor detecting the external object.

25. The method according to claim 21, further comprising:
estimating a width of the external object according to the number of the distance sensor detecting the external object; and
generating a signal for adjusting a width of a real stream according to the width of the external object;
wherein the characteristic data comprises the width of the external object, and the water supplying signal comprises the signal for adjusting the width of the real stream.

26. The method according to claim 1, further comprising:
providing a display module; and
controlling the display module to display a virtual stream according to the water supplying signal.

27. The method according to claim 1, further comprising:
providing at least one light bar; and
controlling the light bar to emit light according to the characteristic data or the water supplying signal.

28. The method according to claim 1, further comprising:
providing a water tank; and
controlling the water tank to open or close according to the characteristic data.

29. The method according to claim 21, further comprising:
providing a drinking water module; and
controlling the drinking water module to open or close according to a position of the distance sensor detecting the external object.

30. The method according to claim 21, further comprising:
providing a soap dispensing module; and
controlling the soap dispensing module to be turned on or turned off according to the position of the distance sensor detecting the external object.

31. A smart water supply, comprising:
an object detecting module for detecting an external object;
a water supplying module; and
a control component, electrically connected to the object detecting module and the water supplying module, and configured to perform the following steps:
estimating a characteristic data of the external object when the object detecting module detects the external object, comprising:
binarizing a depth signal of a combined image to generate a binarized image;
obtaining A profile coordinates in the binarized image through a convex hull algorithm, wherein A is an integer;
retrieving four profile coordinates having maximum and minimum X, Y coordinate values from the A profile coordinates;
generating a rectangular object according to the four profile coordinates; and
calculating a central coordinate of the rectangular object according to the four profile coordinates;
determining a water supplying signal according to the characteristic data; and
controlling the water supplying module to supply a real stream according to the water supplying signal.

32. The smart water supply according to claim 31, wherein the object detecting module comprises an infrared object detecting module, an ultrasonic object detecting module and/or a radar object detecting module.

33. The smart water supply according to claim 31, wherein the object detecting module comprises a depth camera disposed above the water supplying module, and the control component controls the depth camera to capture at least one image of the external object.

34. The smart water supply according to claim 31, wherein the object detecting module comprises at least one distance sensor disposed above the water supplying module, and the control component controls the distance sensor to detect the external object.

35. The smart water supply according to claim 31, wherein the water supplying module comprises:
a first water inlet for supplying a first stream;
a multi-channel pipe having a water inlet and at least one water outlet, and the water inlet is connected to the first water inlet;
at least one electromagnetic valve connected to the water outlet of the multi-channel pipe, electrically connected to the control component, and controlling all or a part of the electromagnetic valve to be opened; and
at least one water outlet component connected to the electromagnetic valve for supplying the real stream, comprising the first stream.

36. The smart water supply according to claim 35, wherein the number of the opened electromagnetic valve is positively correlated with the water supplying signal.

37. The smart water supply according to claim 35, wherein the first water inlet is a cold water inlet.

38. The smart water supply according to claim 35, wherein the first water inlet is a non-potable water inlet.

39. The smart water supply according to claim 35, wherein the water supplying module comprises:
a second water inlet for supplying a second stream;
a proportion control valve connected to the first water inlet and the second water inlet; and
a stepper motor electrically connected to the control component and the proportion control valve, and the control component controlling the stepper motor, driving the proportion control valve, adjusting a proportion of the first stream to the second stream, and generating a mixed stream to flow through the multi-channel pipe;
wherein the water inlet of the multi-channel pipe is connected to the first water inlet and a second water inlet through the proportion control valve, and the real stream comprises the mixed stream.

40. The smart water supply according to claim 39, wherein the proportion control valve is a thermostatic valve.

41. The smart water supply according to claim 39, wherein an adjustment proportion of the proportion control valve is associated with the water supplying signal.

42. The smart water supply according to claim 39, wherein the second water inlet is a hot water inlet.

43. The smart water supply according to claim 39, wherein the second water inlet is a drinking water inlet.

44. The smart water supply according to claim 39, further comprising a mixing valve connected to the proportion control valve and the water outlet component.

45. The smart water supply according to claim 39, wherein the water supplying module comprises:

a temperature sensor electrically connected to the control component and controlling the temperature sensor to sense a current temperature of the mixed stream.

46. The smart water supply according to claim 45, wherein the real stream comprises a real waterfall.

47. The smart water supply according to claim 46, wherein a width of the real waterfall is positively correlated with the water supplying signal.

48. The smart water supply according to claim 31, further comprising a water tank for receiving the real stream.

49. The smart water supply according to claim 31, further comprising at least one light bar electrically connected to the control component and controlling the light bar to emit light.

50. The smart water supply according to claim 49, wherein a light color of the light bar corresponds to a specified temperature.

51. The smart water supply according to claim 31, further comprising a soap dispensing module for providing a soap liquid or a soap.

52. The smart water supply according to claim 31, further comprising a display module disposed above the water supplying module, electrically connected to the control component, and controlling the display module to display a virtual stream.

53. The smart water supply according to claim 52, wherein the control component controls the display module to display the virtual stream according to the water supplying signal.

54. The smart water supply according to claim 53, wherein the virtual stream comprises a virtual waterfall.

55. The smart water supply according to claim 54, wherein a width of the virtual waterfall is positively correlated with the water supplying signal.

56. The smart water supply according to claim 53, wherein the virtual stream comprises a virtual lateral vortex or a plurality of rising bubbles.

57. The smart water supply according to claim 52, further comprising a unidirectional glass attached to a surface of the display module.

58. The smart water supply according to claim 31, further comprising a mirror disposed above the water supplying module.

* * * * *